(12) United States Patent
Tanaka et al.

(10) Patent No.: US 8,815,484 B2
(45) Date of Patent: Aug. 26, 2014

(54) TONER INCLUDING COMPOUND HAVING BISAZO SKELETON

(71) Applicant: Canon Kabushiki Kaisha, Tokyo (JP)

(72) Inventors: Masatake Tanaka, Yokohama (JP);
Masashi Hirose, Machida (JP);
Takayuki Toyoda, Yokohama (JP);
Waka Hasegawa, Kawasaki (JP);
Yasuaki Murai, Kawasaki (JP);
Masashi Kawamura, Yokohama (JP);
Yuki Hasegawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/646,384

(22) Filed: Oct. 5, 2012

(65) Prior Publication Data

US 2013/0095421 A1    Apr. 18, 2013

(30) Foreign Application Priority Data

Oct. 12, 2011   (JP) ................................. 2011-224614

(51) Int. Cl.
    *G03G 9/097*    (2006.01)
    *G03G 9/09*     (2006.01)

(52) U.S. Cl.
    USPC ................................. 430/108.22; 430/108.23

(58) Field of Classification Search
    USPC ........................................ 430/108.22, 108.23
    See application file for complete search history.

(56) References Cited

U.S. PATENT DOCUMENTS

| | | | |
|---|---|---|---|
| 6,117,606 A | 9/2000 | Macholdt et al. | |
| 6,586,151 B1 | 7/2003 | Naka et al. | |
| 6,703,176 B2 | 3/2004 | Naka et al. | |
| 6,756,486 B1 | 6/2004 | Bindra et al. | |
| 6,803,164 B2 | 10/2004 | Mizoo et al. | |
| 6,953,646 B2 | 10/2005 | Doujo et al. | |
| 7,123,862 B2 | 10/2006 | Hasegawa et al. | |
| 7,141,342 B2 | 11/2006 | Toyoda et al. | |
| 7,160,660 B2 | 1/2007 | Dojo et al. | |
| 7,250,479 B2 | 7/2007 | Le et al. | |
| 7,264,910 B2 | 9/2007 | Toyoda et al. | |
| 7,288,357 B2 | 10/2007 | Toyoda et al. | |
| 7,348,367 B2 | 3/2008 | Thetford et al. | |
| 7,368,211 B2 | 5/2008 | Hasegawa et al. | |
| 7,470,494 B2 | 12/2008 | Nishiyama et al. | |
| 7,582,152 B2 | 9/2009 | Jaunky et al. | |
| 7,582,401 B2 | 9/2009 | Ogawa et al. | |
| 7,662,986 B2 | 2/2010 | Le et al. | |
| 7,666,962 B2 | 2/2010 | Le et al. | |
| 7,678,524 B2 | 3/2010 | Hasegawa et al. | |
| 7,704,659 B2 | 4/2010 | Ogawa et al. | |
| 7,714,075 B1 | 5/2010 | Le et al. | |
| 7,811,734 B2 | 10/2010 | Ogawa et al. | |
| 7,833,685 B2 | 11/2010 | Tanaka et al. | |
| 7,833,687 B2 | 11/2010 | Kato et al. | |
| 7,939,231 B2 | 5/2011 | Ogawa et al. | |
| 8,084,174 B2 | 12/2011 | Hasegawa et al. | |
| 8,124,306 B2 | 2/2012 | Hirata et al. | |
| 8,211,606 B2 * | 7/2012 | Murai et al. | 430/108.23 |
| 8,377,616 B2 | 2/2013 | Tani et al. | |
| 2007/0215008 A1 | 9/2007 | Schweikart et al. | |
| 2009/0005474 A1 | 1/2009 | Jaunky et al. | |
| 2009/0087769 A1 * | 4/2009 | Weber et al. | 430/108.23 |
| 2009/0305156 A1 * | 12/2009 | Weber et al. | 430/108.23 |
| 2010/0273101 A1 * | 10/2010 | Tani et al. | 430/108.23 |
| 2011/0311910 A1 | 12/2011 | Matsui et al. | |
| 2012/0040285 A1 | 2/2012 | Shibata et al. | |
| 2012/0231384 A1 | 9/2012 | Aoki et al. | |
| 2012/0231388 A1 | 9/2012 | Kawamura et al. | |

FOREIGN PATENT DOCUMENTS

| | | | |
|---|---|---|---|
| JP | 2000-515181 A | 11/2000 | |
| JP | 2003-531001 A | 10/2003 | |
| JP | 3721617 B2 | 11/2005 | |
| JP | 3917764 B2 | 5/2007 | |
| JP | 3984840 B2 | 10/2007 | |
| JP | 4254292 B2 | 4/2009 | |
| JP | 2010-254847 A | 11/2010 | |
| WO | 99/05099 A1 | 2/1999 | |
| WO | 99/42532 A1 | 8/1999 | |
| WO | 2009/060886 A1 | 5/2009 | |
| WO | WO 2012026378 A1 * | 3/2012 | |

OTHER PUBLICATIONS

European Search Report dated Jan. 30, 2013 in European Application No. 12187758.3.

Ponde, et al., "Selective Catalytic Transesterification, Transthiolesterification, and Protection of Carbonyl Compounds over Natural Kaolinitic Clay", J. Org. Chem., vol. 63, No. 4, 1998, pp. 1058-1063.

Kumar, et al., "Knorr Cyclizations and Distonic Superelectrophiles", J. Org. Chem, vol. 72, No. 25, 2007, pp. 9761-9764.

Matyjaszewski, et al., "Atom Transfer Radical Polymerization", Chem. Rev., vol. 101, No. 9, 2001, pp. 2921-2990.

Peyser, "Glass Transition Temperatures of Polymers", Polymer Handbook, Third Edition, 1989, pp. VI 209-VI 277.

Hasegawa, et al., U.S. Appl. No. 13/725,202, filed Dec. 21, 2012.

Jikken Kagaku Koza (Experimental Chemistry Guide Book), Maruzen Co., Ltd., 2nd edition, vol. 17-2, Jan. 20, 1963, pp. 162-179.

(Continued)

*Primary Examiner* — Christopher Rodee

(74) *Attorney, Agent, or Firm* — Fitzpatrick, Cella, Harper and Scinto

(57) ABSTRACT

An object of the present invention is to provide a toner having high dispersibility of an azo pigment in a binder resin and a good color tone, having suppressed image fogging and high transfer efficiency, and providing a stable image for a long time. The toner including toner base particles, each of which includes: at least a binder resin, a compound in which a specific bisazo skeleton unit bonds to a specific polymer resin unit, and an azo pigment as a colorant.

10 Claims, 2 Drawing Sheets

(56) References Cited

OTHER PUBLICATIONS

Shin Jikken Kagaku Koza (New Experimental Chemistry Guide Book), Maruzen Co., Ltd., 1st edition, vol. 15, Feb. 20, 1977, pp. 390-448.
Hawker, et al., "New Polymer Synthesis by Nitroxide Mediated Living Radical Polymerizations", Chem. Rev., vol. 101, 2001, pp. 3661-3688.
Kamigaito, et al., "Metal-Catalyzed Living Radical Polymerization", Chem. Rev., vol. 101, 2001, pp. 3689-3745.
Goto, et al., "Mechanism-Based Invention of High-Speed Living Radical Polymerization Using Organotellurium Compounds and Azo-Initiators", J. Am. Chem. Soc., vol. 125, 2003, pp. 8720-8721.
Sheehan, et al., "A Convenient Synthesis of Water-Soluble Carbodiimides", J. Org. Chem., vol. 26, No. 7, 1961 pp. 2525-2528.
Sonntag, "The Reactions of Aliphatic Acid Chlorides", Chem. Rev., vol. 52, No. 2, 1953, pp. 237-416.
Chinese Office Action dated Jan. 22, 2014 in Chinese Application No. 201210387273.7.

* cited by examiner

TONER INCLUDING COMPOUND HAVING BISAZO SKELETON

BACKGROUND OF THE INVENTION

1. Field of the Invention

The present invention relates to a toner including compound having a bisazo skeleton unit and a polymer resin unit as a pigment dispersant and used for electrophotography, electrostatic recording, electrostatic printing, or toner jet recording.

2. Description of the Related Art

For example, Japanese Patent No. 03917764 discloses a method using an azo pigment as a colorant for a toner. In the case where such an azo pigment is used as the colorant for a toner, the pigment needs to be finely dispersed in a binder resin or a polymerizable monomer in the toner in order to improve spectral characteristics such as coloring power and transparency. Unfortunately, usually, a fine azo pigment is likely to cause crystal growth or dislocations due to a thermal history and contact with a solvent in a dispersing step or a production step subsequent thereto, undesirably reducing the coloring power or the transparency. Further, in a process of producing a toner using the azo pigment, particularly in a process of producing a toner by a polymerization method, the fine azo pigment aggregates again to increase viscosity of a pigment dispersion liquid.

In order to improve these problems, a variety of pigment dispersants has been proposed. For example, a polymer dispersant has been disclosed in which a site having affinity with an azo pigment as a colorant covalently bonds to an oligomer or polymer site having affinity with a solvent and a binder resin (see Japanese Patent No. 03984840). Further, an example has been disclosed in which a comb polymer dispersant known as Solsperse (registered trademark) and having an acid or basic site is used (see International Application No. WO 99/42532).

Meanwhile, recently, higher image quality of an output image has been desired. For this reason, image defects such as image fogging, i.e., a toner developed in a non-image portion and an uneven density of an image caused by low transfer efficiency of the toner need to be solved.

SUMMARY OF THE INVENTION

Unfortunately, the pigment dispersants according to Japanese Patent No. 03984840 and WO 99/42532 have insufficient affinity with the azo pigment. For this reason, the pigment is not sufficiently dispersed, and the color tone of the toner, suppression of image fogging, improvement in transfer efficiency, and the like, which are demanded of a highly fine image, are not satisfied yet. Further, in the case where a toner is produced by the polymerization method using the pigment dispersant and the azo pigment, the pigment becomes finer in the pigment dispersing step. Following this, the viscosity of the pigment dispersion liquid is undesirably increased.

Accordingly, an object of the present invention is to provide a toner having improved dispersibility of an azo pigment in a binder resin and a good color tone. Another object of the present invention is to provide a toner having high transfer efficiency in which image fogging is suppressed. Further another object of the present invention is to provide a toner obtained by a production method in which in a process of producing a toner using the azo pigment, dispersion stability of a pigment dispersion liquid is improved, and increase in the viscosity of the pigment dispersion liquid is suppressed.

The objects above are achieved by the present invention below.

Namely, the present invention provides a toner including toner base particles, each of which includes:

i) a binder resin;
ii) a compound; and
iii) an azo pigment as a colorant, the compound having a structure in which a unit represented by formula (1) or formula (2):

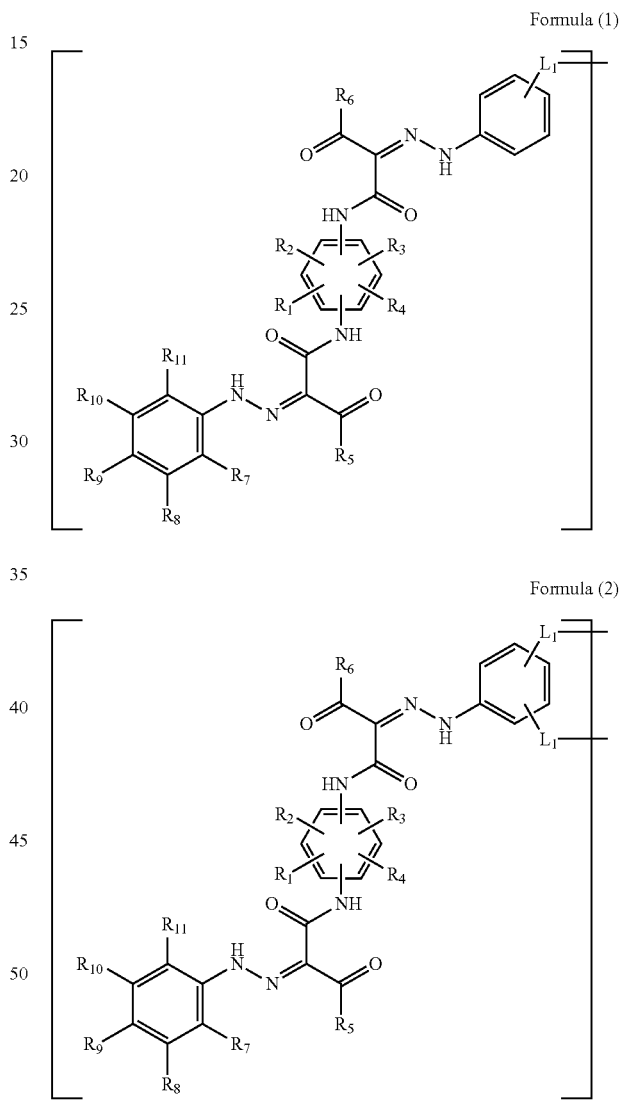

[wherein $R_1$ to $R_4$ represent a hydrogen atom or a halogen atom, $R_5$ and $R_6$ represent an alkyl group having 1 to 6 carbon atoms or a phenyl group, $R_7$ to $R_{11}$ represent a hydrogen atom, a $COOR_{12}$ group, or a $CONR_{13}R_{14}$ group, at least one of $R_7$ to $R_{11}$ is a $COOR_{12}$ group or a $CONR_{13}R_{14}$ group, and $R_{12}$ to $R_{14}$ represent a hydrogen atom or an alkyl group having 1 to 3 carbon atoms, and $L_1$ represents a divalent linking group]

bonds to a polymer unit having at least one of a partial structure represented by formula (3) and a partial structure represented by formula (4):

Formula (3)

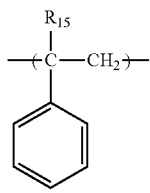

[wherein $R_{15}$ represents a hydrogen atom or an alkyl group]

Formula (4)

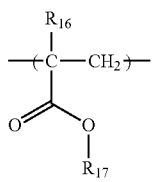

[wherein $R_{16}$ represents a hydrogen atom or an alkyl group, and $R_{17}$ represents a hydrogen atom, alkyl group, or an aralkyl group].

The present invention provides a toner including a compound having the configuration above as a pigment dispersant. The compound according to the present invention has high affinity with a water-insoluble solvent, a polymerizable monomer, a binder resin for a toner, and an azo pigment, and particularly high affinity with an acetoacetanilide pigment. Accordingly, by use of the compound as a pigment dispersant for a toner, the azo pigment such as C.I. Pigment Yellow 155 is dispersed in the binder resin well to provide a toner having a good color tone. Addition of the compound having the bisazo skeleton unit in the toner provides a toner having high transfer efficiency in which image fogging is suppressed. Further, the compound can improve the dispersion stability of the azo pigment in the water-insoluble solvent, and suppress increase in the viscosity of the pigment dispersion liquid. Accordingly, a toner is provided in which the pigment keeps high dispersibility in a process of producing a toner using a polymerization method.

Further features of the present invention will become apparent from the following description of exemplary embodiments with reference to the attached drawings.

DESCRIPTION OF THE EMBODIMENTS

Figure 1:
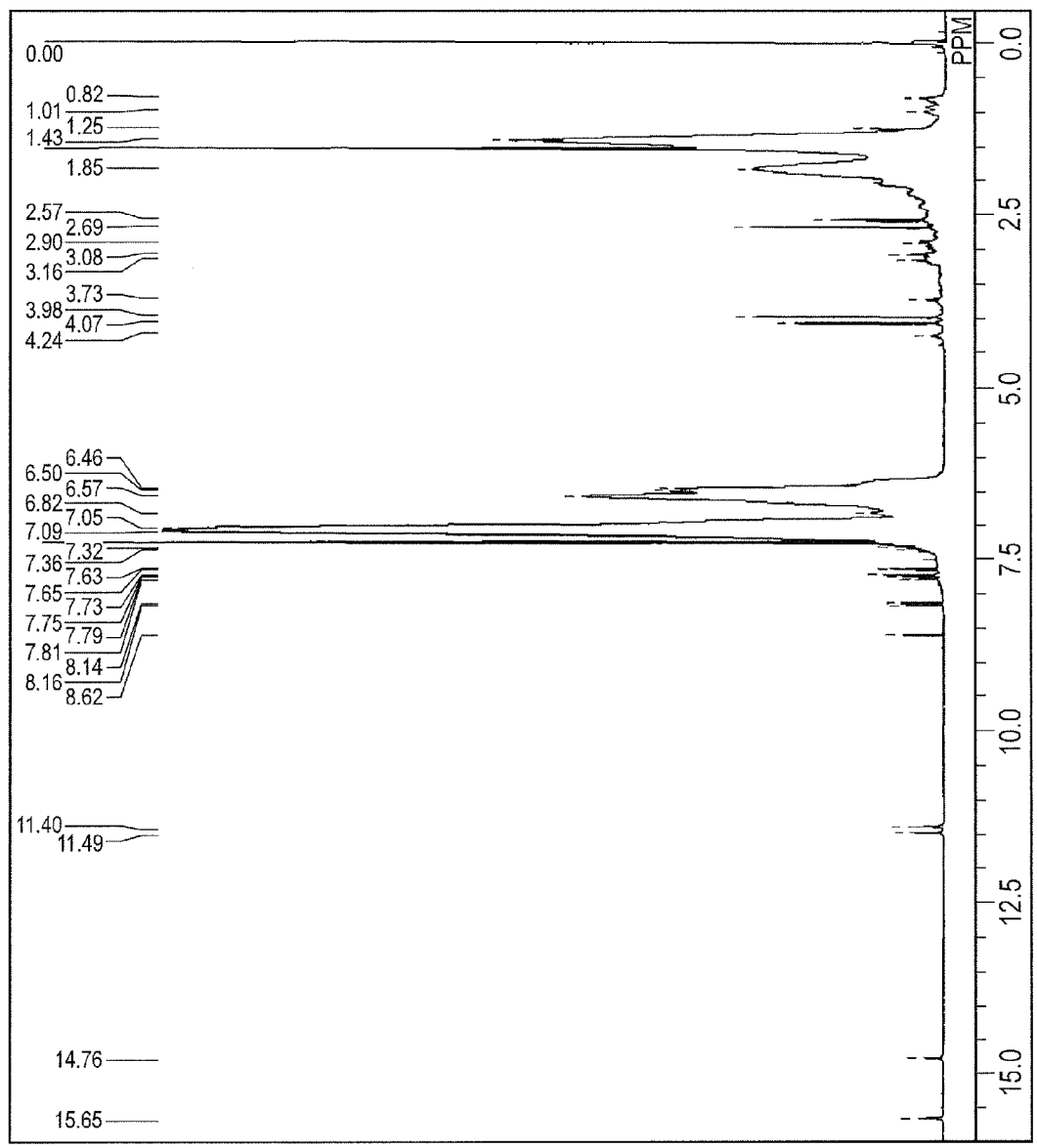
FIG. 1 is a drawing illustrating a $^1$H NMR spectrum at room temperature and 400 MHz of a compound (25) having a bisazo skeleton in CDCl$_3$.

Preferred embodiments of the present invention will now be described in detail in accordance with the accompanying drawings.

The toner according to the present invention will be described.

The toner according to the present invention includes toner base particles, each of which includes a binder resin; a compound; and an azo pigment as a colorant, the compound having a structure in which a unit represented by formula (1) or formula (2) (also referred to as a "bisazo skeleton unit"):

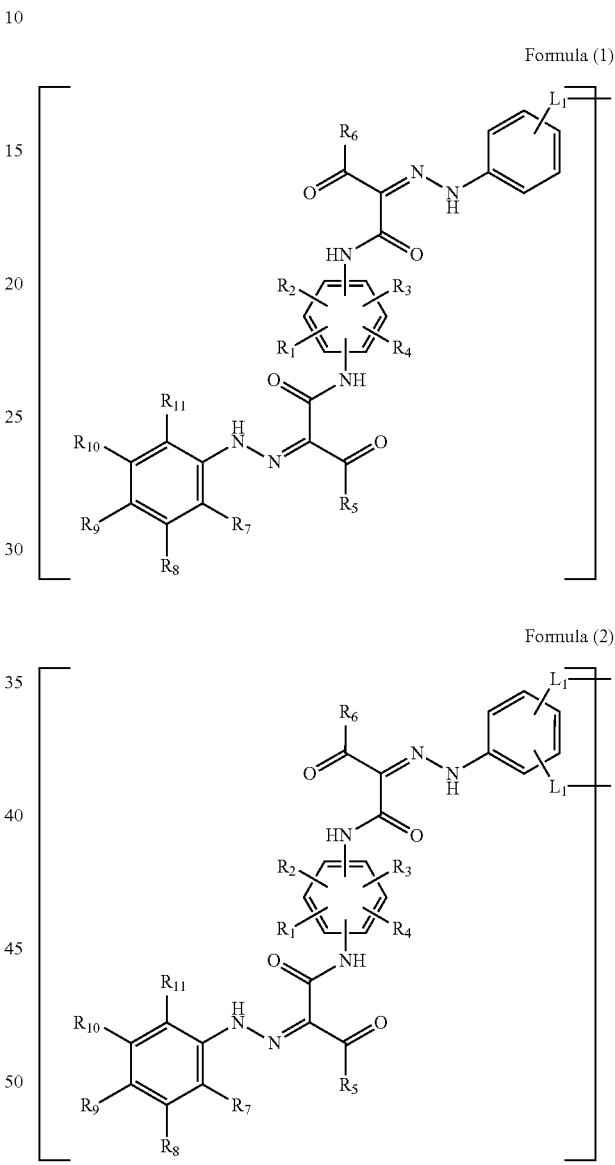

[wherein $R_1$ to $R_4$ represent a hydrogen atom or a halogen atom, $R_5$ and $R_6$ represent an alkyl group having 1 to 6 carbon atoms or a phenyl group, $R_7$ to $R_{11}$ represent a hydrogen atom, a COOR$_{12}$ group, or a CONR$_{13}$R$_{14}$ group, at least one of $R_7$ to $R_{11}$ is a COOR$_{12}$ group or a CONR$_{13}$R$_{14}$ group, and $R_{12}$ to $R_{14}$ represent a hydrogen atom or an alkyl group having 1 to 3 carbon atoms, $L_1$ represents a divalent linking group]

bonds to a polymer unit having at least one of a partial structure represented by formula (3) and a partial structure represented by formula (4) (also referred to as a "polymer resin unit"):

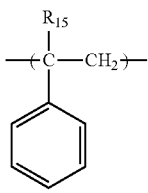

Formula (3)

[wherein $R_{15}$ represents a hydrogen atom or an alkyl group]

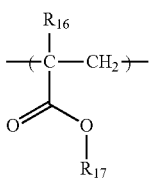

Formula (4)

[wherein $R_{16}$ represents a hydrogen atom or an alkyl group, and $R_{17}$ represents a hydrogen atom, alkyl group, or an aralkyl group].

The configuration of the compound having a bisazo skeleton unit represented by formula (1) or formula (2) will be described. The compound having the bisazo skeleton unit includes a bisazo skeleton unit represented by formula (1) or (2) and having high affinity with the azo pigment, and a polymer resin unit having at least one of a monomer unit represented by formula (3) and a monomer unit represented by formula (4) and having high affinity with the water-insoluble solvent.

First, the bisazo skeleton unit represented by formula (1) or (2) will be specifically described.

In formula (1) or (2), examples of a halogen atom in $R_1$ to $R_4$ include a fluorine atom, a chlorine atom, a bromine atom, and an iodine atom.

$R_1$ to $R_4$ in formula (1) or (2) are preferably a hydrogen atom from the viewpoint of affinity with the pigment.

Examples of substitution positions of $R_1$ to $R_4$ and two acylacetamide groups in formula (1) or (2) include substitution of the acylacetamide groups at the o-position, the m-position, and the p-position. With respect to the affinity with the pigment derived from the difference in the substitution position, the highest affinity is obtained in the case of substitution of the acylacetamide groups at the p-position.

In formula (1) or (2), an alkyl group in $R_5$ and $R_6$ is not particularly limited as long as the alkyl group has 1 to 6 carbon atoms, and examples thereof include linear, branched, or cyclic alkyl groups such as a methyl group, an ethyl group, an n-propyl group, an n-butyl group, an n-pentyl group, an n-hexyl group, an isopropyl group, an isobutyl group, a sec-butyl group, a tert-butyl group, and a cyclohexyl group.

In formula (1) or (2), another substituent may be substituted for the substituent in $R_5$ and $R_6$ unless the another substituent remarkably inhibits the affinity with the pigment. In this case, examples of the optionally substituted substituent include a halogen atom, a nitro group, an amino group, a hydroxyl group, a cyano group, and a trifluoromethyl group.

$R_5$ and $R_6$ in formula (1) or (2) can be arbitrarily selected from the substituents listed above. From the viewpoint of the affinity with the pigment, the methyl group is preferred.

In formula (1) or (2), $L_1$ is a divalent linking group, which links the bisazo skeleton unit to the polymer resin unit.

The unit in formula (1) bonds to the polymer resin unit by $L_1$ at one position while the unit in formula (2) bonds to the polymer resin unit at two positions.

$L_1$ in formula (1) or (2) is not particularly limited as long as $L_1$ is a divalent linking group. From the viewpoint of ease of production, preferred are cases where the bisazo skeleton unit bonds to the polymer resin unit to form a carboxylic acid ester bond, a carboxylic acid amide bond, and a sulfonic acid ester bond.

From the viewpoint of the affinity with the pigment, the substitution position of $L_1$ in formula (1) or (2) is preferably the case where at least one $L_1$ is located at the p-position with respect to a hydrazo group.

In formula (1) or (2), $R_7$ to $R_{11}$ are a hydrogen atom, a $COOR_{12}$ group or a $CONR_{13}R_{14}$ group, and at least one of $R_7$ to $R_{11}$ is a $COOR_{12}$ group or a $CONR_{13}R_{14}$ group. From the viewpoint of the affinity with the pigment, preferably, $R_8$ and $R_{11}$ are a $COOR_{12}$ group, and $R_7$, $R_9$, and $R_{10}$ are a hydrogen atom.

Examples of the alkyl group in $R_{12}$ to $R_{14}$ in formula (1) or (2) include a methyl group, an ethyl group, an n-propyl group, and an isopropyl group.

From the viewpoint of the affinity with the pigment, preferably, $R_{12}$ and $R_{13}$ are a methyl group, and $R_{14}$ is a methyl group or a hydrogen atom in $R_{12}$ to $R_{14}$ in formula (1) or (2).

Preferred is the bisazo skeleton unit represented by formula (1), and from the viewpoint of the affinity with the pigment, particularly preferred is the bisazo skeleton having the unit represented by formula (5):

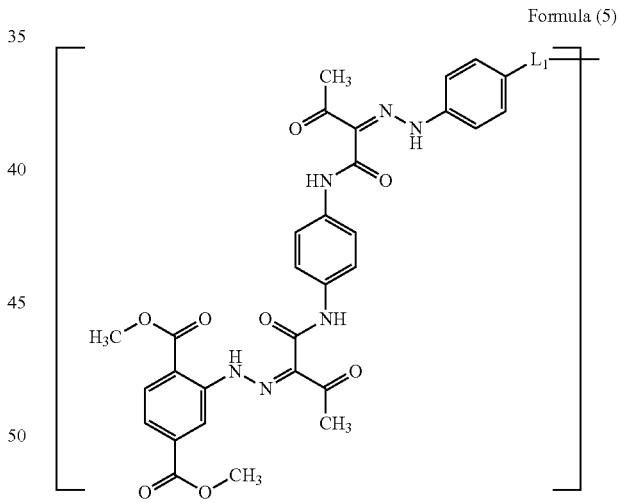

Formula (5)

[wherein $L_1$ represents a divalent linking group].

Next, the polymer resin unit according to the present invention having at least one of a monomer unit represented by formula (3) and a monomer unit represented by formula (4) will be described.

Examples of the alkyl group in $R_{15}$ in formula (3) include a methyl group and an ethyl group.

$R_{15}$ in formula (3) can be arbitrarily selected from the alkyl groups and a hydrogen atom. From the viewpoint of ease of production, a hydrogen atom or a methyl group is preferred.

Examples of the alkyl group in $R_{16}$ in formula (4) include a methyl group and an ethyl group.

$R_{16}$ in formula (4) can be arbitrarily selected from the alkyl groups and a hydrogen atom. From the viewpoint of ease of production, a hydrogen atom or a methyl group is preferred.

Examples of the alkyl group in $R_{17}$ in formula (4) include linear, branched, or cyclic alkyl groups such as a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, an n-behenyl group, an isopropyl group, an isobutyl group, a sec-butyl group, a tert-butyl group, a 2-ethylhexyl group, and a cyclohexyl group.

Examples of the aralkyl group in $R_{17}$ in formula (4) include a benzyl group and a phenethyl group.

$R_{17}$ in formula (4) can be arbitrarily selected from the substituents listed above. From the viewpoint of the affinity with the water-insoluble solvent, those having 4 or more carbon atoms are preferred.

The polymer resin unit in the present invention can control affinity with a dispersion medium by changing the proportion of the monomer unit represented by formula (3) or (4). In the case where the dispersion medium is a nonpolar solvent such as styrene, a larger proportion of the monomer unit represented by formula (3) is preferred from the viewpoint of affinity with a dispersion medium. In the case where the dispersion medium is a solvent having polarity to some extent such as acrylic acid ester, a larger proportion of the monomer unit represented by formula (3) is preferred from the viewpoint of the affinity with a dispersion medium.

In the molecular weight of the polymer resin unit in the present invention, the number average molecular weight is preferably not less than 500 from the viewpoint of improvement in the dispersibility of the pigment. A larger molecular weight provides a higher effect of improving the dispersibility of the pigment. If the molecular weight is excessively large, however, the affinity with the water-insoluble solvent is inferior. Accordingly, such an excessively large molecular weight is not preferred. Accordingly, the number average molecular weight of the polymer resin unit is preferably 200000. Besides, considering ease of production, the number average molecular weight of the polymer resin unit is more preferably within the range of 2000 to 50000.

As disclosed in National Publication of International Patent Application No. 2003-531001, a method is known in which a branched aliphatic chain is introduced into the terminal in a polyoxyalkylenecarbonyl dispersant to improve dispersibility. In the polymer resin unit according to the present invention, a branched aliphatic chain can be introduced into the terminal and the dispersibility may be improved if a telechelic polymer resin unit is synthesized by a method such as ATRP (Atom Transfer Radical Polymerization) as described later.

In the compound having the bisazo skeleton unit according to the present invention, the bisazo skeleton unit may be scattered at random. Preferably, one or a plurality of blocks are formed at one end and localized because the effect of improving the dispersibility is higher.

In the compound having the bisazo skeleton unit according to the present invention, the affinity with the pigment is higher as the number of the bisazo skeleton unit is larger. The excessively large number of the bisazo skeleton unit, however, reduces the affinity with the water-insoluble solvent and is not preferred. Accordingly, the number of the bisazo skeleton unit is preferably within the range of 1 to 10, and more preferably 1 to 5 based on 100 monomers that form the polymer resin unit.

As illustrated in the drawing below, the bisazo skeleton unit represented by formula (1) has tautomers represented by formulas (7) and (8). These tautomers are included within the scope of the present invention.

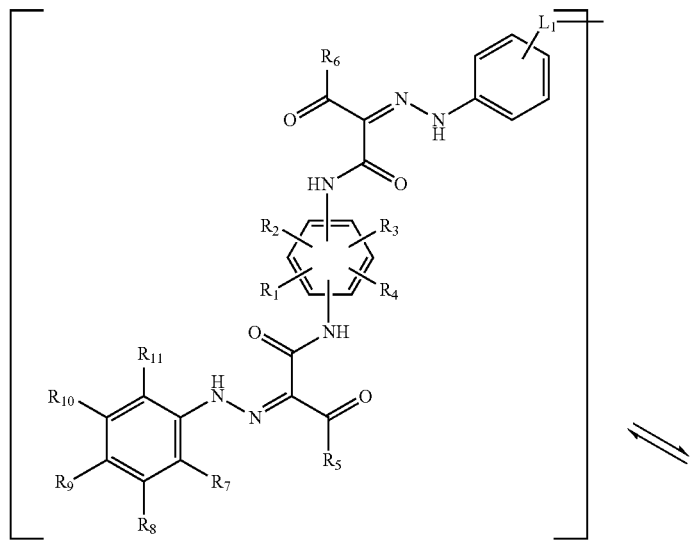

Formula (1)

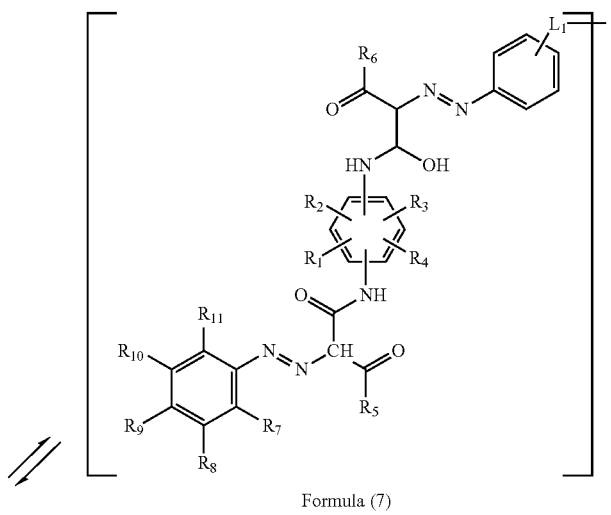
Formula (7)
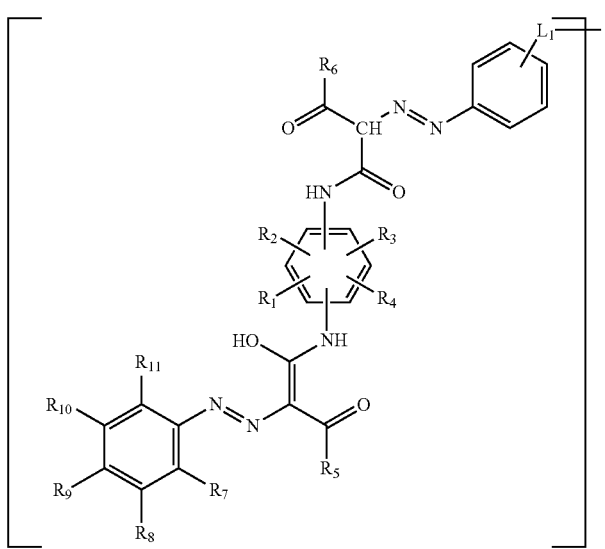
Formula (8)
[wherein $R_1$ to $R_{11}$ and $L_1$ each are the same as those in formula (1).]
As illustrated in the drawing below, the bisazo skeleton unit represented by formula (2) has tautomers represented by formulas (9) and (10). These tautomers are also included within the scope of the present invention.

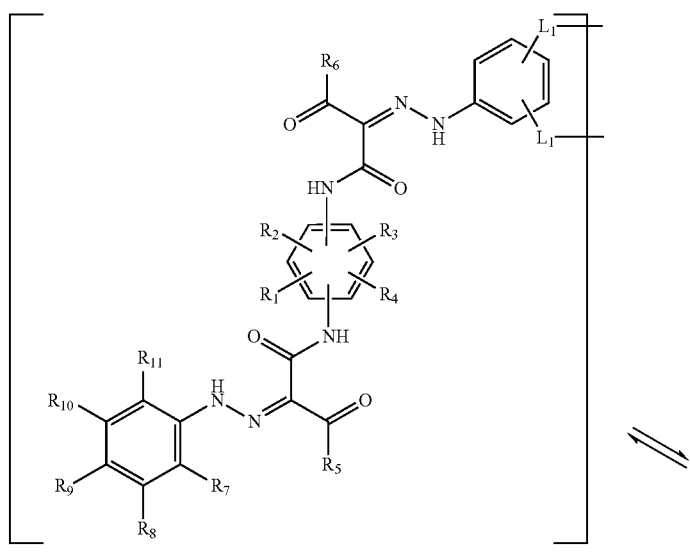
Formula (2)
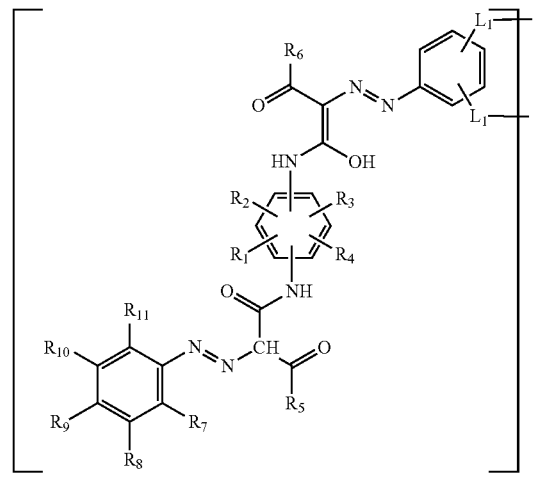
Formula (9)
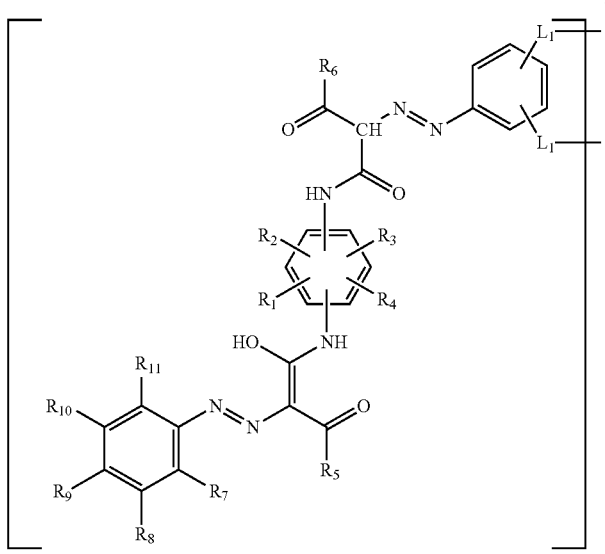
Formula (10)
[wherein $R_1$ to $R_{11}$ and $L_1$ each are the same as those in formula (2).]

The bisazo skeleton unit according to the present invention represented by formula (1) or formula (2) can be synthesized according to a known method. An example of a synthesis scheme of synthesizing a bisazo compound intermediate product (20) will be shown below.

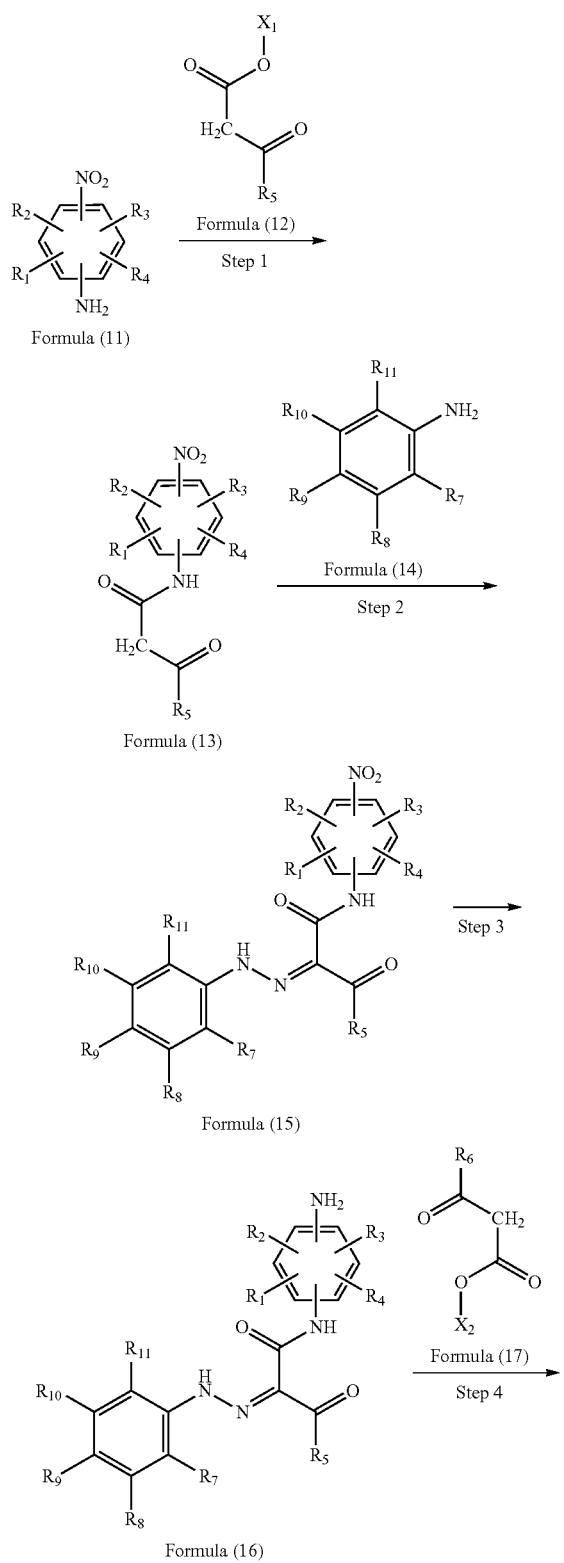

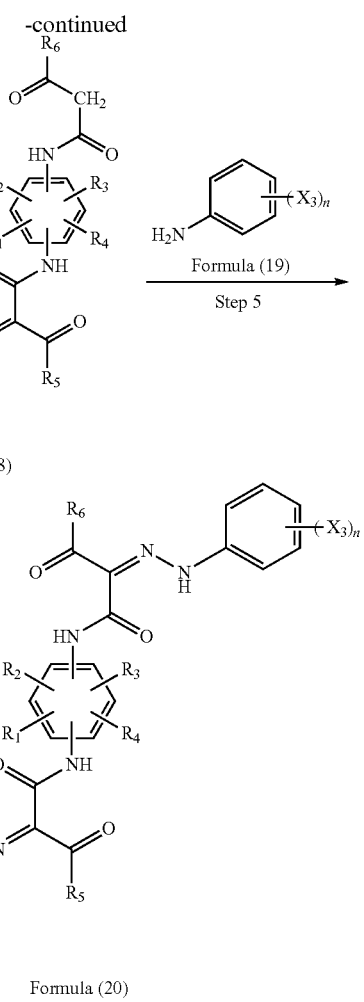

[wherein $R_1$ to $R_{11}$ are the same as those in formula (1) or formula (2); $X_1$ in formula (12) and $X_2$ in formula (17) represent a leaving group; $X_3$ in formulas (19) and (20) represents a substituent that reacts to form the linking group $L_1$ in formula (1) or (2); n represents an integer value of 1 or 2.]

In the scheme exemplified above, a bisazo compound intermediate product (20) is synthesized by Step 1 of amidizing a nitroaniline derivative represented by formula (11) and an acetoacetic acid analog represented by formula (1) to synthesize an intermediate product (13) as an acetoacetanilide analog, Step 2 of diazo coupling the intermediate product (13) to an aniline derivative (14) to synthesize an azo compound (15), Step 3 of reducing a nitro group in the azo compound (15) to synthesize an intermediate product (16) as an aniline analog, Step 4 of amidizing the intermediate product (16) and an acetoacetic acid analog represented by formula (17) to synthesize an intermediate product (18) as an acetoacetanilide analog, and Step 5 of diazo coupling the intermediate product (18) to an aniline derivative (19).

First, Step 1 will be described. In Step 1, a known method can be used [for example, Datta E. Ponde et al., "The Journal of Organic Chemistry," (the United States), American Chemical Society, 1998, Vol. 63, No. 4, pp. 1058-1063]. In the case where $R_5$ in formula (13) is a methyl group, synthesis is allowed by a method using diketene instead of the raw material (12) [for example, Kiran Kumar Solingapuram Sai et al., "The Journal of Organic Chemistry," (the United States), American Chemical Society, 2007, Vol. 72, No. 25, pp. 9761-9764].

A variety of the nitroaniline derivatives (11) and the acetoacetic acid analogs (12) are commercially available, and easily available. The nitroaniline derivative (11) and the acetoacetic acid analog (12) can also be synthesized by a known method easily.

The step can be performed without a solvent. In order to prevent rapid progress of the reaction, preferably, the step is performed in the presence of a solvent. The solvent is not particularly limited unless the solvent inhibits the reaction, and examples thereof include alcohols such as methanol, ethanol, and propanol; esters such as methyl acetate, ethyl acetate, and propyl acetate; ethers such as diethyl ether, tetrahydrofuran, and dioxane; hydrocarbons such as benzene, toluene, xylene, hexane, and heptane; halogen-containing hydrocarbons such as dichloromethane, dichloroethane, and chloroform; amides such as N,N-dimethylformamide, N-methylpyrrolidone, and N,N-dimethylimidazolidinone; nitriles such as acetonitrile and propionitrile; acids such as formic acid, acetic acid, and propionic acid; and water. Two or more of the solvents can be used in combination, and the mixing ratio in use by mixing can be arbitrarily determined according to the solubility of a solute. The amount of the solvent to be used can be arbitrarily determined, and is preferably in the range of 1.0 to 20 times by mass based on the compound represented by formula (11) from the viewpoint of the reaction rate.

The step is performed usually at a temperature in the range of 0° C. to 250° C., and completed usually within 24 hours.

Next, Step 2 will be described. In Step 2, a known method can be used. Specifically, examples thereof include a method described below. First, in a methanol solvent, the aniline derivative (14) is reacted with a diazotization agent such as sodium nitrite or nitrosylsulfuric acid in the presence of an inorganic acid such as hydrochloric acid or sulfuric acid to synthesize a corresponding diazonium salt. Further, the diazonium salt is coupled to the intermediate product (13) to synthesize the azo compound (15).

A variety of the aniline derivatives (14) are commercially available, and easily available. The aniline derivative (14) can also be synthesized by a known method easily.

The step can be performed without a solvent. In order to prevent rapid progress of the reaction, preferably, the step is performed in the presence of a solvent. The solvent is not particularly limited unless the solvent inhibits the reaction, and examples thereof include alcohols such as methanol, ethanol, and propanol; esters such as methyl acetate, ethyl acetate, and propyl acetate; ethers such as diethyl ether, tetrahydrofuran, and dioxane; hydrocarbons such as benzene, toluene, xylene, hexane, and heptane; halogen-containing hydrocarbons such as dichloromethane, dichloroethane, and chloroform; amides such as N,N-dimethylformamide, N-methylpyrrolidone, and N,N-dimethylimidazolidinone; nitriles such as acetonitrile and propionitrile; acids such as formic acid, acetic acid, and propionic acid; and water. Two or more of the solvents can be used in combination, and the mixing ratio in use by mixing can be arbitrarily determined according to the solubility of a solute. The amount of the solvent to be used can be arbitrarily determined, and is preferably in the range of 1.0 to 20 times by mass based on the compound represented by formula (14) from the viewpoint of the reaction rate.

The step is performed usually at a temperature in the range of −50° C. to 100° C., and completed usually within 24 hours.

Next, Step 3 will be described. In Step 3, a known method can be used [examples of a method using a metal compound or the like include "Jikken Kagaku Koza," Maruzen Company, Limited, the second edition, Vol. 17-2, pp. 162-179; and examples of a contact hydrogenation method include "Shin Jikken Kagaku Koza, Maruzen Company, Limited, the first edition, Vol. 15, pp. 390-448, or WO 2009-060886].

The step can be performed without a solvent. In order to prevent rapid progress of the reaction, preferably, the step is performed in the presence of a solvent. The solvent is not particularly limited unless the solvent inhibits the reaction, and examples thereof include alcohols such as methanol, ethanol, and propanol; esters such as methyl acetate, ethyl acetate, and propyl acetate; ethers such as diethyl ether, tetrahydrofuran, and dioxane; hydrocarbons such as benzene, toluene, xylene, hexane, heptane; amides such as N,N-dimethylformamide, N-methylpyrrolidone, and N,N-dimethylimidazolidinone. Two or more of the solvents can be used in combination, and the mixing ratio in use by mixing can be arbitrarily determined. The amount of the solvent to be used can be arbitrarily determined according to the solubility of a solute, and is preferably in the range of 1.0 to 20 times by mass based on compound represented by formula (15) from the viewpoint of the reaction rate.

The step is performed usually at a temperature in the range of 0° C. to 250° C., and completed usually within 24 hours.

Next, Step 4 will be described. In Step 4, the intermediate product (18) as the acetoacetanilide analog can be synthesized using the same method as that in Step 1.

Next, Step 5 will be described. In Step 5, the bisazo compound intermediate product (20) can be synthesized using the same method as that in Step 2.

A variety of the nitroaniline derivatives (19) are commercially available, and easily available. The nitroaniline derivative (19) can also be synthesized by a known method easily.

Examples of a method of synthesizing the compound having bisazo skeleton unit represented by formula (1) or (2) from the obtained bisazo compound intermediate product (20) include methods (i) to (iii) described below.

First, the method (i) will be specifically described by describing the scheme below.

Method (i)

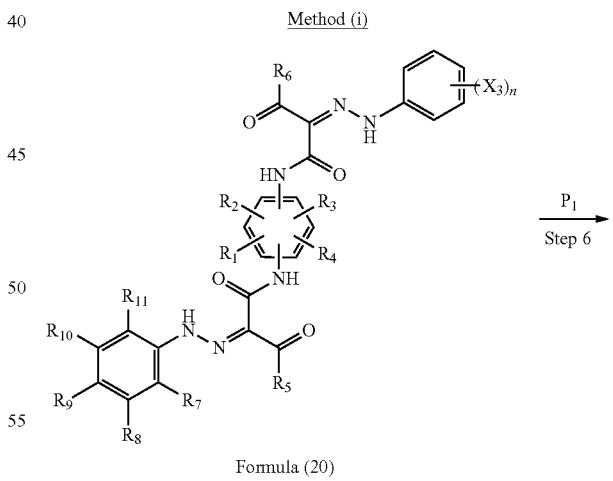

Formula (20)

Compound having bisazo compound skeleton unit represented by Formula (1) or (2)

[wherein $R_1$ to $R_{11}$, $X_3$, and n are the same as those in formula (20) in the synthesis scheme of synthesizing the bisazo compound intermediate product (20); $P_1$ represents a polymer resin unit having at least one of a monomer unit represented by formula (3) and a monomer unit represented by formula (4)].

First, a method for synthesizing the polymer resin unit $P_1$ used in Step 6 will be described. The polymer resin unit $P_1$ can be synthesized using a known polymerization method [examples thereof include Krzysztof Matyjaszewski et al., "Chemical Reviews," (the United States), American Chemical Society, 2001, Vol. 101, pp. 2921-2990].

Specifically, examples thereof include radical polymerization, cationic polymerization, anionic polymerization, and use of the radical polymerization is preferred from the viewpoint of ease of production.

The radical polymerization can be performed by use of a radical polymerization initiator, irradiation with radiation or laser light, use of a photopolymerization initiator in combination with irradiation with light, heating, or the like.

Any radical polymerization initiator can be used as long as the radical polymerization initiator can generate radicals to initiate the polymerization reaction. The radical polymerization initiator can be selected from a compound that generates radicals by action of heat, light, radiation, an oxidation and reduction reaction, or the like. Examples thereof include azo compounds, organic peroxides, inorganic peroxides, organic metal compounds, and photopolymerization initiators. More specifically, examples thereof include azo polymerization initiators such as 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile); organic peroxide polymerization initiators such as benzoyl peroxide, di-tert-butyl peroxide, tert-butylperoxyisopropyl carbonate, tert-hexyl peroxybenzoate, and tert-butyl peroxybenzoate; inorganic peroxide polymerization initiators such as potassium persulfate and ammonium persulfate; and redox initiators such as ferrous hydrogen peroxide redox initiators, benzoyl peroxide-dimethylaniline redox initiators, cerium (IV) salt-alcohol redox initiators. Examples of the photopolymerization initiators include benzophenone photopolymerization initiators, benzoin photopolymerization initiators, acetophenone photopolymerization initiators, and thioxanthone photopolymerization initiators. Two or more of these radical polymerization initiators may be used in combination.

The amount of the polymerization initiator to be used is preferably controlled in the range of 0.1 to 20 parts by mass based on 100 parts by mass of the monomer so as to obtain a copolymer having target molecular weight distribution.

The polymer resin unit represented by $P_1$ can be produced by using any method of solution polymerization, suspension polymerization, emulsion polymerization, dispersion polymerization, precipitation polymerization, and bulk polymerization, and the method is not particularly limited. Preferred is the solution polymerization in a solvent in which the components used in production can be dissolved. Specifically, examples of the solvent include alcohols such as methanol, ethanol, and 2-propanol; ketones such as acetone and methyl ethyl ketone; ethers such as tetrahydrofuran and diethyl ether; ethylene glycol monoalkyl ethers or acetates thereof; propylene glycol monoalkyl ethers or acetates thereof; polar organic solvents such as diethylene glycol monoalkyl ethers; and nonpolar solvents such as toluene and xylene depending on cases, and these can be used singly or mixed and used. Among these, the solvents having a boiling point in the range of 100 to 180° C. are more preferably used singly or mixed and used.

The suitable range of the polymerization temperature depends on the kind of the radical polymerization reaction. Specifically, usually, the polymerization is performed at a temperature in the range of −30 to 200° C., and a more preferred temperature range is 40 to 180° C.

The molecular weight distribution and molecular structure of the polymer resin unit represented by $P_1$ can be controlled using a known method. Specifically, the polymer resin unit having controlled molecular weight distribution and molecular structure can be produced, for example, using a method using an addition-fragmentation chain transfer agent (see Japanese Patent Nos. 4254292 and 03721617), an NMP method using dissociation and bond of amine oxide radicals [such as Craig J. Hawker et al., "Chemical Reviews," (the United States), American Chemical Society, 2001, Vol. 101, pp. 3661-3688], an ATRP method in which polymerization is performed using a halogen compound as a polymerization initiator, a heavy metal, and a ligand [such as Masami Kamigaito et al., "Chemical Reviews," (the United States), American Chemical Society, 2001, Vol. 101, pp. 3689-3746], a RAFT method using dithiocarboxylic acid ester or a xanthate compound as a polymerization initiator (such as National Publication of International Patent Application No. 2000-515181), and an MADIX method (such as WO 99/05099), and a DT method [such as Atsushi Goto et al., "Journal of The American Chemical Society," (the United States), American Chemical Society, 2003, Vol. 125, pp. 8720-8721].

Next, Step 6 will be described. In Step 6, a known method can be used. Specifically, for example, by using the polymer resin unit $P_1$ having a carboxyl group and the bisazo compounds (20) in which $X_3$ is a substituent having a hydroxyl group, the compound having bisazo skeleton unit represented by formula (1) or (2) can be synthesized in which the linking group $L_1$ has a carboxylic acid ester bond. Alternatively, by using the polymer resin unit $P_1$ having a hydroxyl group and a raw material in which $X_3$ in formula (20) is a substituent having a sulfonic acid group, the compound having bisazo skeleton unit represented by formula (1) or (2) can be synthesized in which the linking group $L_1$ has a sulfonic acid ester bond. Further, by using the polymer resin unit $P_1$ having a carboxyl group and a raw material in which $X_3$ in formula (20) is a substituent having an amino group, the compound having bisazo skeleton unit represented by formula (1) or (2) can be synthesized in which the linking group $L_1$ has a carboxylic acid amide bond. Specifically, examples of the known method include a method using a dehydration condensing agent such as 1-ethyl-3-(3-dimethylaminopropyl) carbodiimidehydrochloric acid salt or the like (such as John C. Sheehan et al., "The Journal of Organic Chemistry", (the United States), American Chemical Society, 1961, Vol. 26, No. 7, pp. 2525-2528); and a Schotten-Baumann method (such as Norman O. V. Sonntag, "Chemical Reviews," (the United States), American Chemical Society, 1953, Vol. 52, No. 2, pp. 237-416).

The step can be performed without a solvent. In order to prevent rapid progress of the reaction, preferably, the step is performed in the presence of a solvent. The solvent is not particularly limited unless the solvent inhibits the reaction, and examples thereof include ethers such as diethyl ether, tetrahydrofuran, and dioxane; hydrocarbons such as benzene, toluene, xylene, hexane, and heptane; halogen-containing hydrocarbons such as dichloromethane, dichloroethane, and chloroform; amides such as N,N-dimethylformamide, N-methylpyrrolidone, and N,N-dimethylimidazolidinone; and nitriles such as acetonitrile and propionitrile. Two or more of the solvents can be used by mixing, and the mixing ratio in use by mixing can be arbitrarily determined according to the solubility of a solute. The amount of the solvent to be used can be arbitrarily determined. From the viewpoint of the reaction rate, the amount is preferably in the range of 1.0 to 20 times by mass based on the compound represented by formula (20).

The step is performed usually at a temperature in the range of 0° C. to 250° C., and completed usually within 24 hours.

Next, the method (ii) will be specifically described by describing the scheme below.

Method (ii)

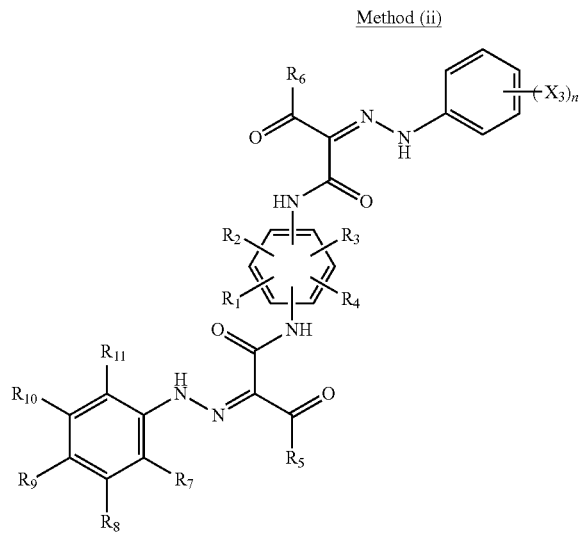

Formula (20)

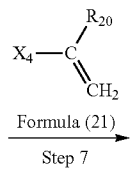

Formula (21)

Step 7

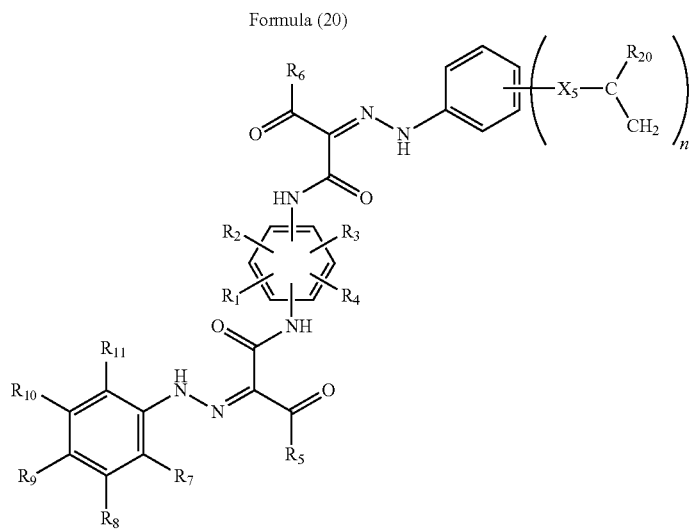

Formula (22)

Compound having bisazo
compound skeleton unit
represented by Formula (1) or (2)

Step 8

[wherein $R_1$ to $R_{11}$, $X_3$, and n in formula (20) are the same as those in formula (20) in the synthesis scheme of synthesizing the bisazo compound intermediate product (20); $R_{20}$ in formula (21) represents a hydrogen atom or an alkyl group, and $X_4$ represents a substituent that reacts with $X_3$ in formula (20) to form $X_5$ in formula (22). $R_1$ to $R_{11}$, $R_{20}$, and n in formula (22) are the same as those in formulas (20) and (21), and $X_5$ represents a linking group formed by reacting $X_3$ in formula (20) with $X_4$ in formula (21)].

In the scheme exemplified above, the compound having the bisazo compound skeleton unit represented by formula (1) or (2) is synthesized by Step 7 of introducing the vinyl group-containing compound represented by formula (21) into the bisazo compound intermediate product represented by formula (20) to synthesize the polymerizable monomer (22) having the bisazo compound skeleton, and Step 8 of copolymerizing the polymerizable monomer (22) having the bisazo compound skeleton with the polymerizable monomer(s) represented by formula (3) and/or formula (4).

First, Step 7 will be described. In Step 7, the polymerizable monomer (22) having the bisazo compound skeleton can be synthesized using the same method as that in Step 6 in the method (i).

A variety of the vinyl group-containing compounds (21) are commercially available, and easily available. The vinyl group-containing compound (21) can also be synthesized by a known method easily.

Next, Step 8 will be described. In Step 8, the compound having bisazo skeleton unit represented by formula (1) or (2) can be synthesized using the same method as that in synthesis of the polymer resin unit $P_1$ in the method (i).

Next, the method (iii) will be specifically described by describing the scheme below.

Method (iii)

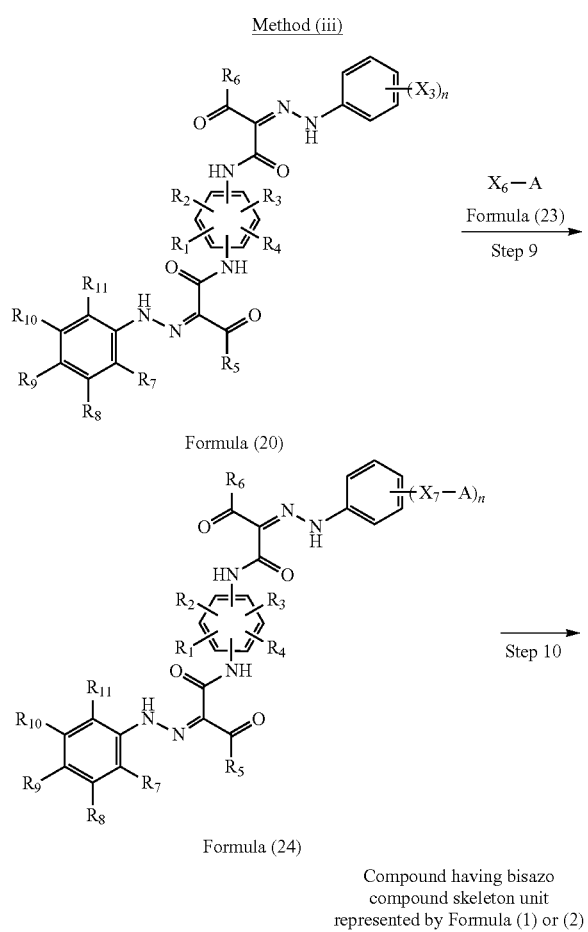

Formula (20)

Formula (24)

Compound having bisazo compound skeleton unit represented by Formula (1) or (2)

[wherein $R_1$ to $R_{11}$, $X_3$, and n in formula (20) are the same as those in formula (20) in the synthesis scheme of synthesizing the bisazo compound intermediate product (20); $X_6$ in formula (23) represents a substituent that reacts with $X_3$ in formula (20) to form $X_7$ in formula (24), and A represents a chlorine atom, a bromine atom, or an iodine atom; $R_1$ to $R_{11}$ and A in formula (24) are the same as those in formula (20), n is the same as that in formula (23), and $X_7$ represents a linking group formed by reacting $X_3$ in formula (20) with $X_6$ in formula (23)].

In the scheme exemplified above, the compound having the bisazo compound skeleton unit represented by formula (1) or (2) is synthesized by Step 9 of introducing the halogen atom-containing compound represented by formula (23) into the bisazo compound intermediate product represented by formula (20) to synthesize the bisazo compound intermediate product (24) having a halogen atom, and Step 10 of polymerizing a polymerizable monomer using the bisazo compound intermediate product (24) having a halogen atom as the polymerization initiator.

First, Step 9 will be described. In Step 9, the bisazo compound intermediate product (24) having a halogen atom can be synthesized using the same method as that in Step 6 in the method (i). Specifically, for example, by using the halogen atom-containing compound (23) having a carboxyl group and the bisazo compounds (20) in which $X_3$ is a substituent having a hydroxyl group, the compound having bisazo skeleton unit represented by formula (1) or (2) can be finally synthesized in which the linking group $L_1$ has a carboxylic acid ester bond.

Alternatively, by using the halogen atom-containing compound (23) having a hydroxyl group and a raw material in which $X_3$ in formula (20) is a substituent having a sulfonic acid group, the compound having bisazo skeleton unit represented by formula (1) or (2) can be finally synthesized in which the linking group $L_1$ has a sulfonic acid ester bond. Further, halogen atom-containing compound (23) having a carboxyl group and a raw material in which $X_3$ in formula (20) is a substituent having an amino group, the compound having bisazo skeleton unit represented by formula (1) or (2) can be finally synthesized in which the linking group $L_1$ has a carboxylic acid amide bond.

Examples of the halogen atom-containing compound (23) having a carboxyl group include chloroacetic acid, α-chloropropionic acid, α-chlorobutyric acid, α-chloroisobutyric acid, α-chlorovaleric acid, α-chloroisovaleric acid, α-chlorocaproic acid, α-chlorophenylacetic acid, α-chlorodiphenylacetic acid, α-chloro-α-phenylpropionic acid, α-chloro-β-phenylpropionic acid, bromoacetic acid, α-bromopropionic acid, α-bromobutyric acid, α-bromoisobutyric acid, α-bromovaleric acid, α-bromoisovaleric acid, α-bromocaproic acid, α-bromophenylacetic acid, α-bromodiphenylacetic acid, α-bromo-α-phenylpropionic acid, α-bromo-β-phenylpropionic acid, iodoacetic acid, α-iodopropionic acid, α-iodobutyric acid, α-iodoisobutyric acid, α-iodovaleric acid, α-iodoisovaleric acid, α-iodocaproic acid, α-iodophenylacetic acid, α-iododiphenylacetic acid, α-iodo-α-phenylpropionic acid, α-iodo-β-phenylpropionic acid, β-chlorobutyric acid, β-bromoisobutyric acid, iododimethylmethylbenzoic acid, and 1-chloroethylbenzoic acid. Halides and acid anhydrides thereof can also be used in the present invention.

Examples of the halogen atom-containing compound (23) having a hydroxyl group include 1-chloroethanol, 1-bromoethanol, 1-iodoethanol, 1-chloropropanol, 2-bromopropanol, 2-chloro-2-propanol, 2-bromo-2-methylpropanol, 2-phenyl-1-bromoethanol, and 2-phenyl-2-iodoethanol.

Next, Step 10 will be described. In Step 10, the compound having bisazo skeleton unit represented by formula (1) or (2) can be synthesized by using the ATRP in the method (i) and polymerizing the polymerizable monomer(s) represented by formula (s) (3) and/or (4) using the bisazo compound intermediate product (24) having a halogen atom as the polymerization initiator.

The compounds represented by formulas (1), (2), (13), (15), (16), (18), (20), (22), and (24) and obtained in the respective steps can be subjected to an isolation and refining method for an organic compound usually used. Examples of the isolation and refining method include recrystallization and reprecipitation using an organic solvent, and column chromatography using silica gel. These methods can be used singly or in combinations of two or more to perform refining. Thereby, the compound with high purity can be obtained.

The compounds represented by formulas (13), (15), (16), (18), (20), (22), and (24) and obtained in the respective steps were identified and determined by a nuclear magnetic resonance spectroscopy [ECA-400, made by JEOL, Ltd.], an ESI-TOF MS (LC/MSD TOF, made by Agilent Technologies, Inc.), and HPLC analysis [LC-20A, made by SHIMADZU Corporation].

The compounds represented by formulas (1) and (2) and obtained in the respective steps were identified and determined by a high-speed GPC [HLC8220GPC, made by Tosoh Corporation], a nuclear magnetic resonance spectroscopy [ECA-400, made by JEOL, Ltd.], and acid value measurement according to JIS K-0070 [Automatic Titrator COM-2500, made by Hiranuma Sangyo Co., Ltd.].

Next, the binder resin in the toner according to the present invention will be described.

Examples of the binder resin in the toner according to the present invention include styrene-methacrylic acid copolymers, styrene-acrylic acid copolymers, polyester resins, epoxy resins, and styrene-butadiene copolymers usually used. In a method for directly obtaining toner base particles by the polymerization method, a polymerizable monomer is used to form the toner base particle. Specifically, preferably used are styrene monomers such as styrene, α-methylstyrene, α-ethylstyrene, o-methylstyrene, m-methylstyrene, p-methylstyrene, o-ethylstyrene, m-ethylstyrene, and p-ethylstyrene; methacrylate monomers such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile, and methacrylic acid amide; acrylate monomers such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile, and acrylic acid amide; and olefin monomers such as butadiene, isoprene, and cyclohexene. These are used singly or used by properly mixing these such that the logical glass transition temperature (Tg) falls within the range of 40 to 75° C. [see "Polymer Handbook," edited by J. Brandrup and E. H. Immergut, (the United States), the third edition, John Wiley & Sons, 1989, pp. 209-277]. At a logical glass transition temperature less than 40° C., problems are likely to be found in storage stability and durability stability of the toner. Meanwhile, at a logical glass transition temperature more than 75° C., the transparency is reduced when a full color image is formed by the toner.

By using a nonpolar resin such as polystyrene in combination with a polar resin such as a polyester resin and a polycarbonate resin in the binder resin in the toner according to the present invention, distributions of additives such as colorant, a charge control agent, and wax can be controlled within the toner. For example, in the case where the toner base particles are directly produced by the suspension polymerization method or the like, the polar resin is added during the polymerization reaction from the dispersing step to the polymerization step. The polar resin is added according to the balance between the polarity of the polymerizable monomer composition to be formed into the toner particle and that of an aqueous medium. As a result, the polar resin can be controlled such that the concentration of the polar resin is continuously changed from the surface from toward the center of the toner base particle, for example, a thin layer of the polar resin is formed on the surface of the toner base particle. At this time, by use of the polar resin having interaction with the compound having the bisazo skeleton unit, a colorant, and a charge control agent, a desirable state of the colorant existing in the toner base particle can be obtained.

Examples of the azo pigment usable for the toner according to the present invention include monoazo pigments, bisazo pigments, or polyazo pigments. Among these, preferred are acetoacetanilide pigments such as C.I. Pigment Yellow 74, C.I. Pigment Yellow 93, C.I. Pigment Yellow 128, C.I. Pigment Yellow 155, C.I. Pigment Yellow 175, and C.I. Pigment Yellow 180 because these have stronger affinity with the compound having the bisazo skeleton unit. Particularly, more preferred is C.I. Pigment Yellow 155 represented by formula (6) because of a high dispersing effect provided by the compound having the bisazo skeleton unit. The pigments may be used singly, or two or more thereof may be mixed.

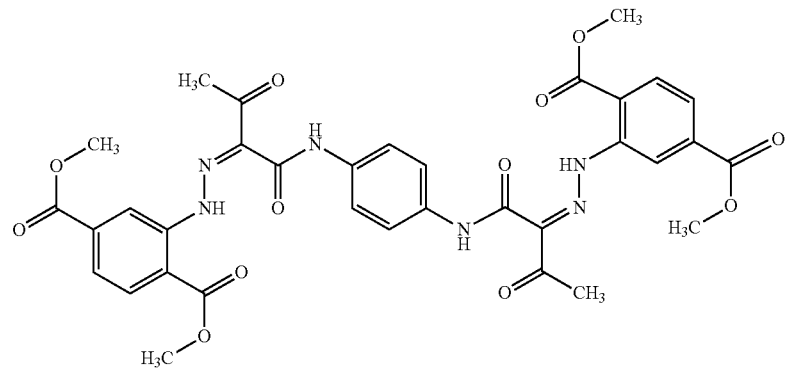

Formula (6)

Other than the pigments above, any pigment having affinity with the compound having the bisazo skeleton unit can be suitably used in the present invention, and is not limited.

Examples of such an azo pigment include C.I. Pigment Orange 1, C.I. Pigment Orange 5, C.I. Pigment Orange 13, C.I. Pigment Orange 15, C.I. Pigment Orange 16, C.I. Pigment Orange 34, C.I. Pigment Orange 36, C.I. Pigment Orange 38, C.I. Pigment Orange 62, C.I. Pigment Orange 64, C.I. Pigment Orange 67, C.I. Pigment Orange 72, C.I. Pigment Orange 74, C.I. Pigment Red 2, C.I. Pigment Red 3, C.I. Pigment Red 4, C.I. Pigment Red 5, C.I. Pigment Red 12, C.I. Pigment Red 16, C.I. Pigment Red 17, C.I. Pigment Red 23, C.I. Pigment Red 31, C.I. Pigment Red 32, C.I. Pigment Red 41, C.I. Pigment Red 17, C.I. Pigment Red 48, C.I. Pigment Red 48:1, C.I. Pigment Red 48:2, C.I. Pigment Red 53:1, C.I. Pigment Red 57:1, C.I. Pigment Red 112, C.I. Pigment Red 144, C.I. Pigment Red 146, C.I. Pigment Red 166, C.I. Pigment Red 170, C.I. Pigment Red 176, C.I. Pigment Red 185, C.I. Pigment Red 187, C.I. Pigment Red 208, C.I. Pigment Red 210, C.I. Pigment Red 220, C.I. Pigment Red 221, C.I. Pigment Red 238, C.I. Pigment Red 242, C.I. Pigment Red 245, C.I. Pigment Red 253, C.I. Pigment Red 258, C.I. Pigment Red 266, C.I. Pigment Red 269, C.I. Pigment Violet 13, C.I. Pigment Violet 25, C.I. Pigment Violet 32, C.I. Pigment Violet 50, C.I. Pigment Blue 25, C.I. Pigment Blue 26, C.I. Pigment Brown 23, C.I. Pigment Brown 25, and C.I. Pigment Brown 41.

These may be a crude pigment or a prepared pigment unless these remarkably inhibit the effect of the compound having the bisazo skeleton unit.

The mass composition ratio of the pigment to the compound having the bisazo skeleton unit in the toner according to the present invention is preferably in the range of 100:1 to 100:100. From the viewpoint of the dispersibility of the pigment, the mass composition ratio is more preferably in the range of 100:10 to 100:50.

The azo pigment is always used as the colorant used for the toner according to the present invention, but other colorant can be used in combination with the pigment unless the other colorant inhibits the dispersibility of the azo pigment.

Examples of the colorant usable in combination include compounds such as condensation azo compounds, isoindolinone compounds, anthraquinone compounds, azo metal complexes, methine compounds, allylamide compounds. Specifically, usable are C.I. Pigment Yellow 12, C.I. Pigment Yellow 13, C.I. Pigment Yellow 14, C.I. Pigment Yellow 15, C.I. Pigment Yellow 17, C.I. Pigment Yellow 62, C.I. Pigment Yellow 83, C.I. Pigment Yellow 94, C.I. Pigment Yellow 95, C.I. Pigment Yellow 97, C.I. Pigment Yellow 109, C.I. Pigment Yellow 110, C.I. Pigment Yellow 111, C.I. Pigment Yellow 120, C.I. Pigment Yellow 127, C.I. Pigment Yellow 129, C.I. Pigment Yellow 147, C.I. Pigment Yellow 151, C.I. Pigment Yellow 154, C.I. Pigment Yellow 168, C.I. Pigment Yellow 174, C.I. Pigment Yellow 176, C.I. Pigment Yellow 181, C.I. Pigment Yellow 185, C.I. Pigment Yellow 191, C.I. Pigment Yellow 194, C.I. Pigment Yellow 213, C.I. Pigment Yellow 214, C.I. Vat Yellows 1, 3, and 20, mineral fast yellow, navel yellow, Naphthol Yellow S, Hansa Yellow G, Permanent Yellow NCG, C.I. Solvent Yellow 9, C.I. Solvent Yellow 17, C.I. Solvent Yellow 24, C.I. Solvent Yellow 31, C.I. Solvent Yellow 35, C.I. Solvent Yellow 58, C.I. Solvent Yellow 93, C.I. Solvent Yellow 100, C.I. Solvent Yellow 102, C.I. Solvent Yellow 103, C.I. Solvent Yellow 105, C.I. Solvent Yellow 112, C.I. Solvent Yellow 162, C.I. Solvent Yellow 163, and the like.

Further, in the present invention, a crosslinking agent can be used in synthesis of the binder resin in order to enhance mechanical strength of the toner particle and control the molecular weight of the particle forming molecule.

Examples of the crosslinking agent used for the toner particle according to the present invention include bifunctional crosslinking agents such as divinylbenzene, bis(4-acryloxypolyethoxyphenyl)propane, ethylene glycol diacrylate, 1,3-butyleneglycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycol #200, #400, and #600, dipropylene glycol diacrylate, polypropylene glycol diacrylate, polyester diacrylate, and those in which diacrylate is replaced by dimethacrylate.

Examples of polyfunctional crosslinking agents include pentaerythritol triacrylate, trimethylolethane triacrylate, trimethylolpropane triacrylate, tetramethylolmethane tetraacrylate, oligoester acrylate, oligoester methacrylate, 2,2-bis(4-methacryloxyphenyl)propane, diallyl phthalate, triallyl cyanurate, triallyl isocyanurate, and triallyl trimellitate.

From the viewpoint of fixing properties and off-set resistance of the toner, the amount of the crosslinking agent to be used is in the range of preferably 0.05 to 10 parts by mass, and range, more preferably 0.1 to 5 parts by mass based on 100 parts by mass of the polymerizable monomer.

Further, in the present invention, a wax component can be used in synthesis of the binder resin in order to prevent adhesion of the toner to a fixing member.

Examples of the wax component usable in the present invention specifically include petroleum waxes such as paraffin wax, microcrystalline wax, and petrolatum and derivatives thereof; montan waxes and derivatives thereof; hydrocarbon waxes obtained by the Fischer-Tropsch and derivatives thereof; polyolefin waxes such as polyethylene and derivatives thereof; and natural waxes such as carnauba wax and candelilla wax and derivatives thereof. Examples of the derivatives include oxides, block copolymers with a vinyl monomer, and graft modified products. Examples of the wax component usable in the present invention also include alcohols such as higher aliphatic alcohol, fatty acids such as stearic acid and palmitic acid, fatty acid amides, fatty acid esters, hard castor oils and derivatives thereof, plant waxes, and animal waxes. These can be used singly or used in combination.

The amount of the wax component to be added is in the range of preferably 2.5 to 15.0 parts by mass, and more preferably 3.0 to 10.0 parts by mass based on 100 parts by mass of the binder resin. If the amount of the wax component to be added is less than 2.5 parts by mass, oilless fixing is difficult. If the amount is more than 15.0 parts by mass, the amount of the wax component is excessively large in the toner particle. For this reason, the excessive wax component existing on the surface of the toner base particle may inhibit desired charging properties. Accordingly, both cases are not preferred.

In the toner according to the present invention, when necessary, a charge control agent can be mixed and used. Thereby, a frictional charge amount can be controlled optimally according to the developing system.

A known charge control agent can be used. Particularly, preferred are charge control agents having a high charging speed and stably keeping a constant charging amount. Further, in the case where the toner base particle is directly produced by the polymerization method, particularly preferred is a charge control agent having low polymerization inhibiting properties and containing substantially no substance soluble in an aqueous dispersion medium.

Examples of the charge control agent for controlling to give negative charge to the toner include polymers or copolymers having a sulfonic acid group, a sulfonic acid salt group, or a sulfonic acid ester group, salicylic acid derivatives and metal complexes thereof, monoazo metal compounds, acetylacetone metal compounds, aromatic oxycarboxylic acids, aromatic mono- and polycarboxylic acids and metal salts thereof, anhydrides thereof, and esters thereof, phenol derivatives such as bisphenol, urea derivatives, metal-containing naphthoic acid compounds, boron compounds, quaternary ammonium salts, calixarene, resin charge control agents. Examples of the charge control agent for controlling to give positive charge to the toner include nigrosine modified products with nigrosine and fatty acid metallic salts, guanidine compounds, imidazole compounds, tributylbenzylammonium-1-hydroxy-4-naphthosulfonic acid salts, quaternary ammonium salts such as tetrabutylammonium tetrafluoroborate, and onium salts of analogs thereof such as phosphonium salts and lake pigments thereof, triphenylmethane dyes and lake pigments thereof (examples of the laking agent include phosphorus tungstate, phosphorus molybdate, phosphorus tungsten molybdate, tannic acid, lauric acid, gallic acid, ferricyanide, and ferrocyanide), metal salts of higher fatty acids, diorganotin oxides such as dibutyltin oxide, dioctyltin oxide, and dicyclohexyltin oxide, diorganotin borates such as dibutyltin borate, dioctyltin borate, dicyclohexyltin borate, and resin charge control agents. These may be used singly or in combinations of two or more.

In the toner according to the present invention, an inorganic fine powder as a fluidizing agent may be added to the toner base particles. As the inorganic fine powder, fine powders of silica, titanium oxide, alumina, or multiple oxides thereof, or those subjected to a surface treatment can be used.

Examples of a method of producing toner base particles that forms the toner according to the present invention include methods used in the related art such as a crushing method, a suspension polymerization method, a suspension granulation method, and an emulsion polymerization method. From the viewpoint of an environmental load during production and controllability of the particle diameter, among these production methods, particularly preferred is a production method of performing granulation in an aqueous medium such as the suspension polymerization method and the suspension granulation method.

In the method of producing the toner according to the present invention, the dispersibility of the pigment can be improved by mixing the compound having bisazo skeleton unit represented by formula (1) or (2) with the azo pigment in advance, and preparing the pigment composition.

The pigment composition can be produced by a wet method or a dry method. Considering that the compound having bisazo skeleton unit represented by formula (1) or (2) has high affinity with the water-insoluble solvent, production by the wet method is preferred because a uniform pigment composition can be produced easily. Specifically, for example, the pigment composition is obtained as follows. The compound having the bisazo skeleton unit, and when necessary, a resin are dissolved in a disperse medium. A pigment powder is gradually added to the mixture while the solution is stirred, and sufficiently with the mixture. Further, a mechanical shear force is applied by a dispersing machine such as a kneader, a roll mill, a ball mill, a paint shaker, a dissolver, an Attritor, a sand mill, and a high speed mill. Thereby, the pigment can be stably finely dispersed in a state of a uniform fine particle.

The disperse medium usable for the pigment composition is not particularly limited. A preferred disperse medium is a water-insoluble solvent in order to obtain the high pigment dispersing effect of the compound having bisazo skeleton unit represented by formula (1) or (2). Examples of the water-insoluble solvent specifically include esters such as methyl acetate, ethyl acetate, and propyl acetate; hydrocarbons such as hexane, octane, petroleumether, cyclohexane, benzene, toluene, and xylene; and halogen-containing hydrocarbons such as carbon tetrachloride, trichloroethylene, and tetrabromoethane.

The disperse medium usable for the pigment composition may be a polymerizable monomer. Specifically, examples thereof can include styrene, α-methylstyrene, α-ethylstyrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, ethylene, propylene, butylene, isobutylene, vinyl chloride, vinylidene chloride, vinyl bromide, vinyl iodide, vinyl acetate, vinyl propionate, vinyl benzoate, methyl methacrylate, ethyl methacrylate, propyl methacrylate, butyl methacrylate, n-octyl methacrylate, dodecyl methacrylate, 2-ethylhexyl-methacrylate, stearyl methacrylate, behenyl methacrylate, phenyl methacrylate, dimethylaminoethyl methacrylate, diethylaminoethyl methacrylate, methyl acrylate, ethyl acrylate, n-butyl acrylate, isobutyl acrylate, propyl acrylate, n-octyl acrylate, dodecyl acrylate, 2-ethylhexyl acrylate, stearyl acrylate, behenyl acrylate, 2-chloroethyl acrylate, phenyl acrylate, vinyl methyl ether, vinyl ethyl ether, vinyl isobutyl ether, vinyl methyl ketone, vinyl hexyl ketone, methyl isopropenyl ketone, vinyl naphthalene, acrylonitrile, methacrylonitrile, and acrylamide.

As the resin usable for the pigment composition, resins usable for the binder resin in the toner according to the present invention can be used. Specifically, examples thereof include styrene-methacrylic acid copolymers, styrene-acrylic acid copolymers, polyester resins, epoxy resins, and styrene-butadiene copolymers. Two or more of these disperse media can be mixed and used. Further, the pigment composition can be isolated by a known method such as filtration, decantation, or centrifugation. The solvent can also be removed by washing.

An aid may be added to the pigment composition during production. Specifically, examples of the aid include a surfactant, pigment and non-pigment dispersants, a filler, a standardizer, a resin, a wax, an antifoaming agent, an antistatic agent, an anti-dust agent, an extender, a shading colorant, a preservant, a drying inhibitor, a rheology control additive, a wetting agent, an antioxidant, a UV absorber, a light stabilizer, or a combination thereof. The compound having the bisazo skeleton unit may be added in advance when a crude pigment is produced.

The toner base particle according to the present invention produced by the suspension polymerization method is produced as follows. The pigment composition, the polymerizable monomer, the wax component, the polymerization initiator, and the like are mixed to prepare a polymerizable monomer composition. Next, the polymerizable monomer composition is dispersed in the aqueous medium to granulate a particle of the polymerizable monomer composition. Then, the polymerizable monomer in the particle of the polymerizable monomer composition in the aqueous medium is polymerized to obtain toner base particles.

Preferably, the polymerizable monomer composition in the step is prepared by dispersing the pigment composition in a first polymerizable monomer to prepare a dispersion liquid, and mixing the dispersion liquid with a second polymerizable monomer. Namely, the pigment can exist in the toner base particle in a better dispersion state by sufficiently dispersing the pigment composition in the first polymerizable monomer, and mixing the pigment composition in the first polymerizable monomer and other toner material with the second polymerizable monomer.

Examples of the polymerization initiator used in the suspension polymerization method can include known polymerization initiators such as azo compounds, organic peroxides, inorganic peroxides, organic metal compounds, and photopolymerization initiators. More specifically, examples thereof include azo polymerization initiators such as 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile), and dimethyl-2,2'-azobis (isobutyrate); organic peroxide polymerization initiators such as benzoyl peroxide, di-tert-butyl peroxide, tert-butylperoxyisopropyl monocarbonate, tert-hexyl peroxybenzoate, and tert-butylperoxybenzoate; inorganic peroxide polymerization initiators such as potassium persulfate and ammonium persulfate; and redox initiators such as ferrous hydrogen peroxide redox initiators, BPO-dimethylaniline redox initiators, and cerium (IV) salt-alcohol redox initiators. Examples of the photopolymerization initiators include acetophenone photopolymerization initiators, benzoinether photopolymerization initiators, and ketal photopolymerization initiators. These methods can be used singly or in combinations of two or more.

The concentration of the polymerization initiator is in the range of preferably 0.1 to 20 parts by mass, and more preferably 0.1 to 10 parts by mass based on 100 parts by mass of the polymerizable monomer. Although the kind of the polymerization initiator slightly varies depending on the polymerization method, the polymerization initiators are used singly or in mixtures, referring to a 10-hour half-life temperature.

Preferably, the aqueous medium used in the suspension polymerization method contains a dispersion stabilizer. As the dispersion stabilizer, known inorganic and organic dispersion stabilizers can be used. Examples of the inorganic dispersion stabilizer include calcium phosphate, magnesium phosphate, aluminum phosphate, zinc phosphate, magnesium carbonate, calcium carbonate, calcium hydroxide, magnesium hydroxide, aluminum hydroxide, calcium metasilicate, calcium sulfate, barium sulfate, bentonite, silica, and alumina. Examples of the organic dispersion stabilizer include sodium salts of polyvinyl alcohol, gelatin, methyl cellulose, methyl hydroxypropyl cellulose, ethyl cellulose, carboxymethyl cellulose, and starches. Nonionic, anionic, and cationic surfactants can also be used. Examples thereof include sodium dodecyl sulfate, sodium tetradecyl sulfate, sodium pentadecyl sulfate, sodium octyl sulfate, sodium oleate, sodium laurate, potassium stearate, and calcium oleate.

Among the dispersion stabilizers, use of a poorly water-soluble inorganic dispersion stabilizer having solubility in an acid is preferred in the present invention. In the present invention, in the case where an aqueous dispersion medium is prepared using such a poorly water-soluble inorganic dispersion stabilizer, the dispersion stabilizer is preferably used in a proportion of 0.2 to 2.0 parts by mass based on 100 parts by mass of the polymerizable monomer from the viewpoint of solution droplet stability of the polymerizable monomer composition in the aqueous medium. In the present invention, the aqueous medium is preferably prepared using 300 to 3000 parts by mass of water based on 100 parts by mass of the polymerizable monomer composition.

In the present invention, in the case where the aqueous medium having the poorly water-soluble inorganic dispersion stabilizer dispersed therein is prepared, a commercially available dispersion stabilizer may be used as it is and dispersed. Preferably, in order to obtain a dispersion stabilizer particle having a fine uniform particle size, the poorly water-soluble inorganic dispersion stabilizer is produced in water under high speed stirring and prepared. For example, in the case where calcium phosphate is used as the dispersion stabilizer, under high speed stirring, a sodium phosphate aqueous solution is mixed with a calcium chloride aqueous solution to form a fine particle of calcium phosphate. Thereby, a preferred dispersion stabilizer can be obtained.

Suitable toner base particles according to the present invention can also be obtained in the case where the toner base particles are produced by the suspension granulation method. The production step in the suspension granulation method has no heating step. For this reason, the method can suppress compatibility of the resin with the wax component caused when a low melting point wax is used, and prevent reduction in the glass transition temperature of the toner attributed to the compatibility. The suspension granulation method has a wide range of choices of the toner material for the binder resin, and easily uses a polyester resin as a main component, which is usually thought to be advantageous for fixing properties. For this reason, this is a production method advantageous in the case of production of the toner whose resin composition is not suitable for the suspension polymerization method.

The toner base particles produced by the suspension granulation method are produced as follows. First, the pigment composition, the binder resin, the wax component, and the like are mixed in a solvent to prepare a solvent composition. Next, the solvent composition is dispersed in the aqueous medium, and a particle of the solvent composition is granulated to obtain a toner particle suspension. Then, the solvent is removed by heating the obtained suspension or reducing pressure. Thus, toner base particles can be obtained.

The solvent composition in the step is preferably prepared by dispersing the pigment composition in a first solvent to prepare a dispersion liquid, and mixing the dispersion liquid with a second solvent. Namely, the pigment can exist in each toner base particle in a better dispersion state by sufficiently dispersing the pigment composition in the first solvent, and mixing the pigment composition in the first solvent and other toner material with the second solvent.

Examples of the solvent usable in the suspension granulation method include hydrocarbons such as toluene, xylene, and hexane; halogen-containing hydrocarbons such as methylene chloride, chloroform, dichloroethane, trichloroethane, and carbon tetrachloride; alcohols such as methanol, ethanol, butanol, and isopropyl alcohol; polyhydric alcohols such as ethylene glycol, propylene glycol, diethylene glycol, and triethylene glycol; cellosolves such as methyl cellosolve and ethyl cellosolve; ketones such as acetone, methyl ethyl ketone, and methyl isobutyl ketone; ethers such as benzyl alcohol ethyl ether, benzyl alcohol isopropyl ether, and tetrahydrofuran; and esters such as methyl acetate, ethyl acetate, and butyl acetate. These can be used singly or in mixtures of two or more. Among these, preferred is a solvent having a low boiling point and that can sufficiently dissolve the binder resin because the solvent in the toner particle suspension is easily removed.

The amount of the solvent to be used is preferably 50 to 5000 parts by mass, and more preferably 120 to 1000 parts by mass based on 100 parts by mass of the binder resin.

The aqueous medium used in the suspension granulation method preferably contains a dispersion stabilizer. As the dispersion stabilizer, known inorganic and organic dispersion stabilizers can be used. Examples of the inorganic dispersion stabilizers include calcium phosphate, calcium carbonate, aluminum hydroxide, calcium sulfate, and barium carbonate. Examples of the organic dispersion stabilizers include water-soluble polymers such as polyvinyl alcohol, methyl cellulose, hydroxyethyl cellulose, ethyl cellulose, sodium salts of carboxymethyl cellulose, sodium polyacrylate, and sodium polymethacrylate; anionic surfactants such as sodium dodecylbenzenesulfonate, sodium octadecylsulfate, sodium oleate, sodium laurate, potassium stearate; cationic surfactants such as laurylamine acetate, stearylamine acetate, and lauryltrimethylammonium chloride; amphoteric surfactants such as lauryldimethylamine oxide; and nonionic surfactants such as polyoxyethylene alkyl ether, polyoxyethylene alkylphenyl ether, and polyoxyethylene alkylamine.

The amount of the dispersant to be used is preferably in the range of 0.01 to 20 parts by mass based on 100 parts by mass of the binder resin from the viewpoint of the solution droplet stability of the solvent composition in the aqueous medium.

In the present invention, a preferred weight average particle diameter of the toner (hereinafter, written as D4) is in the range of 3.00 to 15.0 μm, and more preferably 4.00 to 12.0 μm. At a weight average particle diameter within the range, stable charging properties can be obtained, and image fogging and scattering of the toner after a continuous developing operation (durability operation) of developing a large number of sheets can be suppressed. Moreover, an image with high quality having high reproducibility of a halftone portion and small unevenness of the surface can be obtained.

The ratio of D4 to the number average particle diameter (hereinafter, written as D1) of the toner (hereinafter, written as D4/D1) is preferably not more than 1.35, and more preferably not more than 1.30 because image fogging and reduction in the transfer efficiency can be suppressed well.

The method for controlling D4 and D1 of the toner according to the present invention varies according to the method for producing the toner base particles. For example, in the case of the suspension polymerization method, the D4 and D1 can be controlled by controlling the concentration of the dispersant used in preparation of the aqueous dispersion medium, the reaction stirring rate, or the reaction stirring time.

The toner according to the present invention may be a magnetic toner or a non-magnetic toner. In the case of use as the magnetic toner, a magnetic material may be mixed in the toner base particle that forms the toner according to the present invention, and used. Examples of such a magnetic material include iron oxides such as magnetite, maghemite, and ferrite; or iron oxides containing other metal oxide; metals such as Fe, Co, and Ni; alloys of these metals and metals such as Al, Co, Cu, Pb, Mg, Ni, Sn, Zn, Sb, Be, Bi, Cd, Ca, Mn, Se, Ti, W, and V; and a mixture thereof.

EXAMPLES

Hereinafter, the present invention will be more specifically described using Examples and Comparative Examples, but the present invention will not be limited to Examples below unless departing from the gist. In the description below, "parts" and "%" are based on the mass unless otherwise specified.

Hereinafter, measurement methods used in Examples will be shown.

(1) Measurement of Molecular Weight

The molecular weights of the polymer resin unit and compound having the bisazo skeleton unit according to the present invention are calculated in terms of polystyrene using size exclusion chromatography (SEC). The measurement of the molecular weight by SEC was performed as follows.

A sample was added to an eluent shown below such that the concentration of the sample was 1.0%. The obtained solution was left as it was at room temperature for 24 hours, and filtered with a solvent-resistant membrane filter having a pore diameter of 0.2 μm. This was used as the sample solution, and measured on the condition below:
apparatus: high speed GPC apparatus "HLC-8220GPC" [made by Tosoh Corporation]
columns: two columns of LF-804
eluent: THF
flow rate: 1.0 ml/min
oven temperature: 40° C.
amount of sample to be injected: 0.025 ml In calculation of the molecular weight of the sample, a molecular weight calibration curve created using standard polystyrene resins [made by Tosoh Corporation, TSK Standard Polystyrenes F-850, F-450, F-288, F-128, F-80, F-40, F-20, F-10, F-4, F-2, F-1, A-5000, A-2500, A-1000, and A-500] was used.

(2) Measurement of Acid Value

The acid values of the polymer resin unit and compound having the bisazo skeleton unit according to the present invention are determined by the method shown below.

The basic operation is according to JIS K-0070.

1) 0.5 to 2.0 g of a sample is precisely weighed. The mass at this time is defined W (g).

2) The sample is placed in a 50 ml beaker. 25 ml of a mixed solution of tetrahydrofuran/ethanol (2/1) is poured, and the sample is dissolved.

3) Using an ethanol solution of 0.1 mol/l KOH, titration is performed using a potentiometric titrator [for example, an Automatic Titrator "COM-2500" made by Hiranuma Sangyo Co., Ltd. or the like can be used].

4) The amount of the KOH solution to be used at this time is defined as S (ml). At the same time, a blank sample is measured. The amount of KOH to be used at this time is defined as B (ml).

5) The acid value is calculated by the following equation. f is a factor of the KOH solution.

$$\text{Acid Value} [mg\ KOH/g] = \frac{(S-B) \times f \times 5.61}{W}$$

(3) Analysis of Composition

The structures of the polymer resin unit and compound having the bisazo skeleton unit according to the present invention were determined using the apparatus below.
$^1$H NMR
ECA-400 made by JEOL, Ltd. (solvent used: deuterochloroform)

Production Examples

The compound having bisazo skeleton unit represented by formula (1) or (2) was obtained by the method below.

Production Example of Compound (25)

A compound (25) having the bisazo skeleton unit and having the structure was produced according to the scheme below:

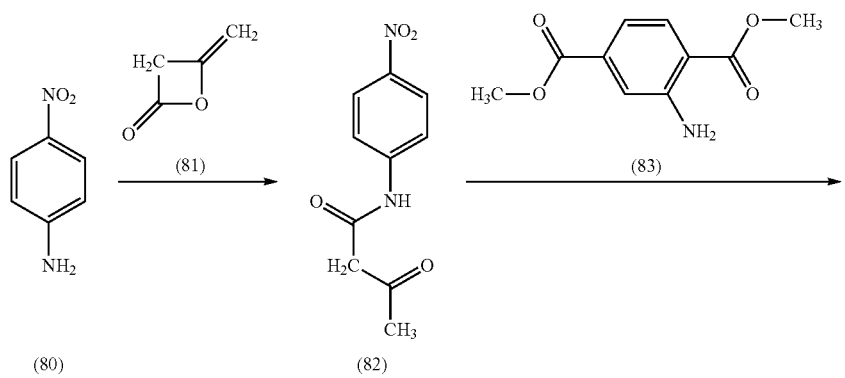
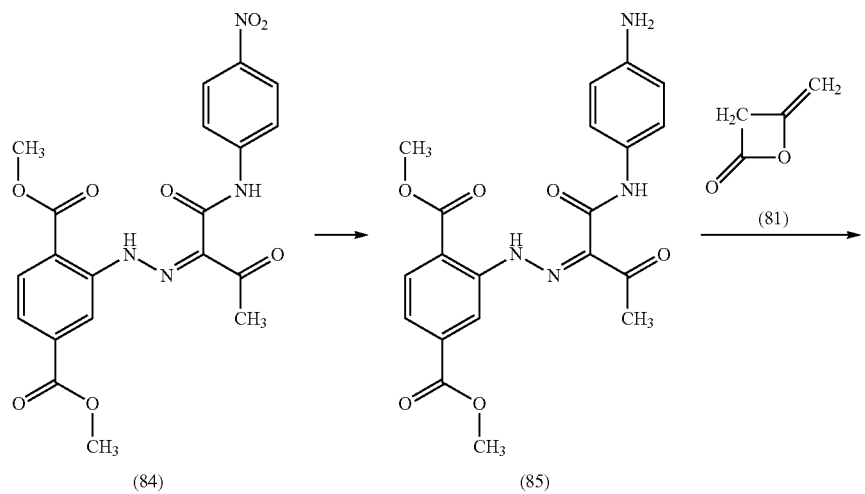
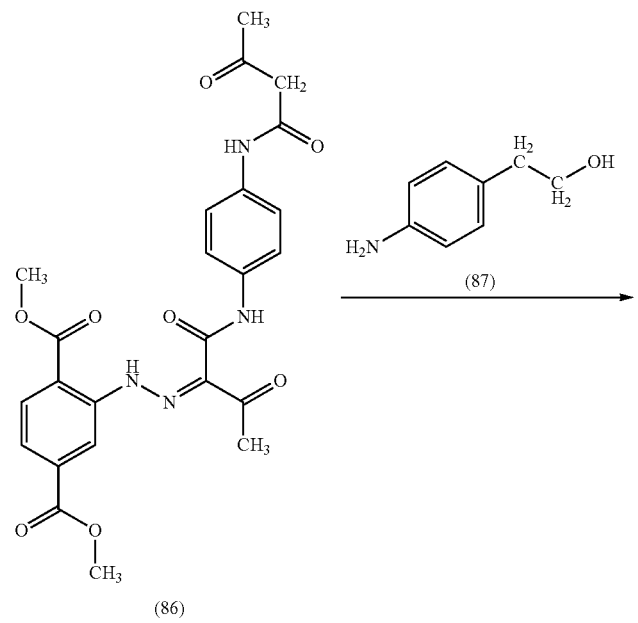

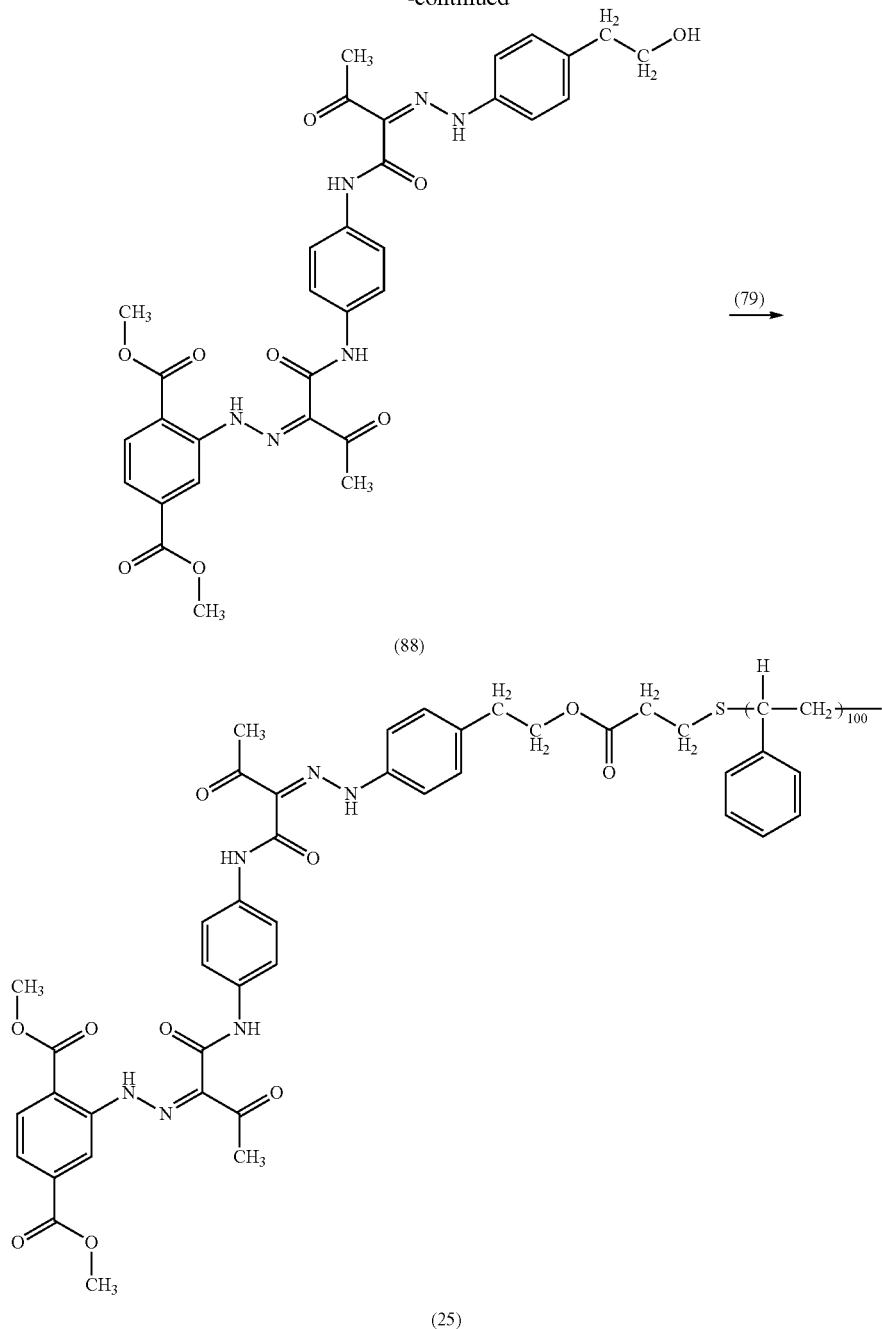

First, while replacement with nitrogen was performed, 100 parts of propylene glycol monomethyl ether was heated, and refluxed at a solution temperature of 120° C. or more. A mixture of 100 parts of styrene, 1.2 parts of β-mercaptopropionic acid, and 1.0 part of tert-butylperoxybenzoate [organic peroxide polymerization initiator PERBUTYL Z (registered trademark) (made by NOF CORPORATION)] was dropped into the solution over 3 hours. After dropping was completed, the solution was stirred for hours. While the solution temperature was raised to 170° C., distillation was performed at normal pressure. After the solution temperature reached 170° C., distillation was performed under a reduced pressure of 1 hPa for 1 hour. Thus, the solvent was removed to obtain a polymer solid product. The solid product was dissolved in tetrahydrofuran, and reprecipitated with n-hexane. The precipitated solid was filtered to obtain a polymer resin unit (79).

Next, 3.11 parts of p-nitroaniline (80) was added to 30 parts of chloroform, and the obtained solution was cooled with ice to 10° C. or less. Then, 1.89 parts of diketene (81) was added thereto. Subsequently, the solution was stirred at 65° C. for 2 hours. After the reaction was completed, the product was extracted with chloroform, and condensed to obtain 4.70 parts of a compound (82) (yield of 94.0%).

Next, 40.0 parts of methanol and 5.29 parts of concentrated hydrochloric acid were added to 4.25 parts of 2-aminodimethyl terephthalate (83), and the mixed solution was cooled with ice to 10° C. or less. A solution in which 2.10 parts of sodium nitrite was dissolved in 6.00 parts of water was added to the solution to make a reaction for 1 hour at the same temperature as above. Next, 0.990 parts of sulfamic acid was added to the solution, and the solution was stirred for 20 minutes (diazonium salt solution). 4.51 parts of the compound (82) was added to 70.0 parts of methanol. The obtained solution was cooled with ice to 10° C. or less, and the diazonium salt solution was added. Subsequently, a solution in which 5.83 parts of sodium acetate was dissolved in 7.00 parts of water was added to make a reaction for 2 hours at 10° C. or less. After the reaction was completed, 300 parts of water was added to the reaction solution, and the reaction solution was stirred for 30 minutes. Then, a solid was filtered, and refined by recrystallization from N,N-dimethylformamide to obtain 8.71 parts of a compound (84) (yield of 96.8%).

Next, 8.58 parts of the compound (84) and 0.40 parts of palladium-activated carbon (5% of palladium) were added to 150 parts of N,N-dimethylformamide, and stirred for 3 hours at 40° C. under a hydrogen gas atmosphere (reaction pressure of 0.1 to 0.4 MPa). After the reaction was completed, the solution was filtered, and condensed to obtain 6.99 parts of a compound (85) (yield of 87.5%).

Next, 6.50 parts of the compound (85) was added to 30.0 parts of chloroform. The solution was cooled with ice to 10° C. or less, and 0.95 parts of diketene (81) was added. Subsequently, the solution was stirred for 2 hours at 65° C. After the reaction was completed, the reaction product was extracted with chloroform, and condensed to obtain 7.01 parts of an azo compound intermediate product (86) (yield of 94.2%).

Next, 15.0 parts of methanol and 1.48 parts of concentrated hydrochloric acid were added to 1.78 parts of 2-(4-nitrophenyl)ethanol (87), and the solution was cooled with ice to 10° C. or less. A solution in which 1.08 parts of sodium nitrite was dissolved in 3.00 parts of water was added to the solution to make a reaction for 1 hour at the same temperature as above. Next, 0.380 parts of sulfamic acid was added to the reaction solution, and the reaction solution was stirred for 20 minutes (diazonium salt solution). A solution in which 7.18 parts of potassium carbonate was dissolved in 7.00 parts of water and 6.50 parts of the compound (86) were added to 70.0 parts of N,N-dimethylformamide. The obtained solution was cooled with ice to 10° C. or less. The diazonium salt solution was added thereto to make a reaction for 2 hours at 10° C. or less.

After the reaction was completed, 300 parts of water was added to the solution, and the solution was stirred for 30 minutes. Then, a solid was filtered, and refined by recrystallization from N,N-dimethylformamide to obtain 7.62 parts of a compound (88) (yield of 91.0%).

Next, 0.689 parts of the compound (88) was added to 100 parts of dehydrated N-methylpyrrolidone, and the solution was heated to 100° C. to dissolve the compound (88). After the dissolution, the temperature was dropped to 50° C. 10.0 parts of the polymer (A) dissolved in 30 parts of dehydrated N-methylpyrrolidone was added, 0.349 parts of 1-ethyl-3-(3-dimethylaminopropyl) carbodiimide.hydrochloric acid salt was added, and the solution was stirred for 3 hours at 50° C. The solution temperature was gradually returned to normal temperature, and stirring was performed overnight to complete the reaction. After the reaction was completed, the solution was condensed, and separated with chloroform. After extraction, refining by silica gel column chromatography, and reprecipitation with methanol were subsequently performed to obtain 8.51 parts of the compound (25).

From the measurements using the apparatuses, it was found that the obtained product has the structure represented by the formula above. The results of analysis are shown below.

[Result of Analysis of Compound (25) Having Bisazo Skeleton Unit]

[1] Results of measurement of molecular weight (GPC):
weight average molecular weight (Mw)=17993, number average molecular weight (Mn)=10742

[2] Result of measurement of acid value:
0 mgKOH/g

[3] Results of $^1$H NMR (400 MHz, CDCl$_3$ at room temperature) (see FIG. 1): δ [ppm]=15.65 (s, 1H), 14.76 (s, 1H), 11.49 (s, 1H), 11.40 (s, 1H), 8.62 (s, 1H), 8.15 (d, 1H), 7.80 (d, 1H), 7.74 (d, 2H), 7.64 (d, 2H), 7.37-6.27 (m, 550H), 4.24 (br, 1H), 4.07 (s, 3H), 3.98 (s, 3H), 3.73 (br, 1H), 3.24-2.84 (m, 10H), 2.69 (s, 3H), 2.57 (s, 3H), 2.45-0.77 (m, 330H)

Production Example of Compound (45)

A compound (45) having a bisazo skeleton unit and having the structure was produced according to the scheme below:

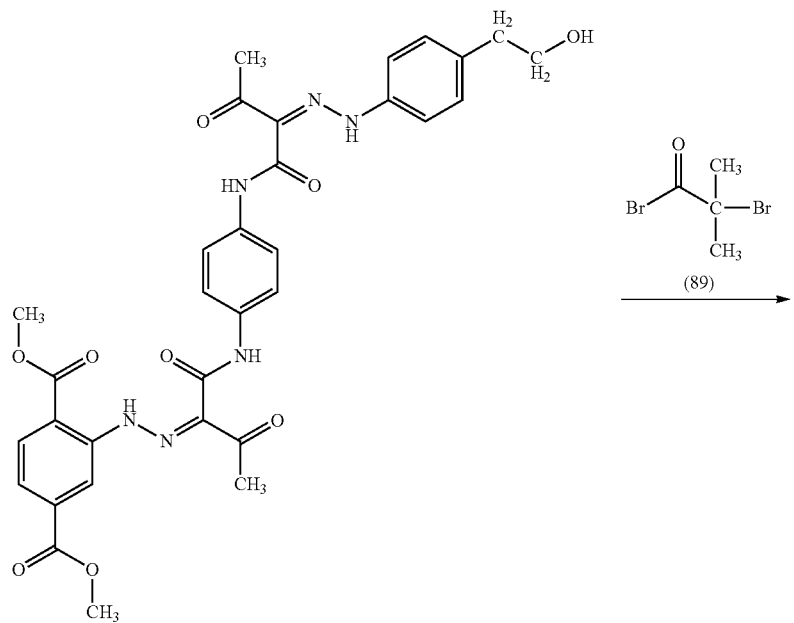

-continued

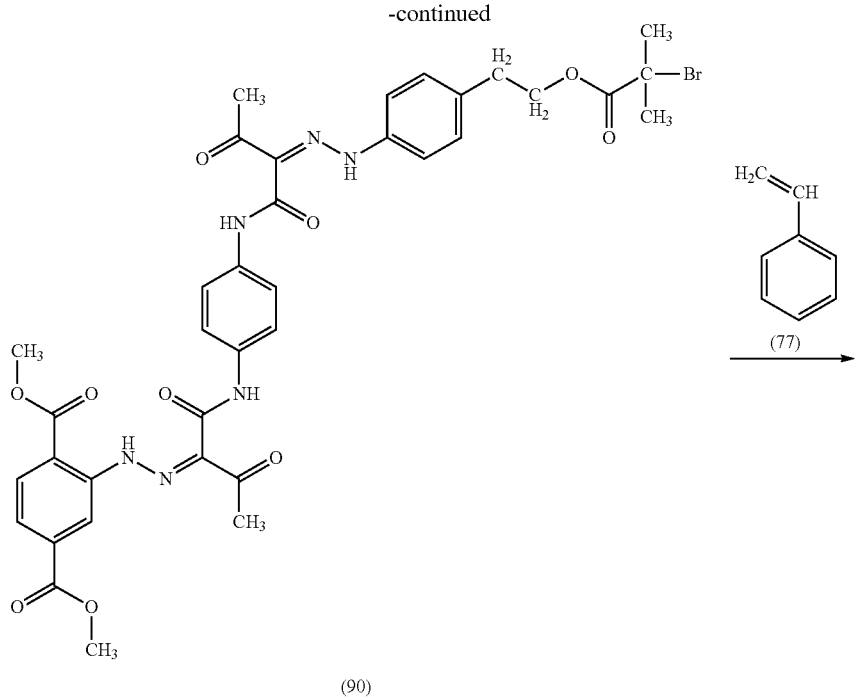

(90)

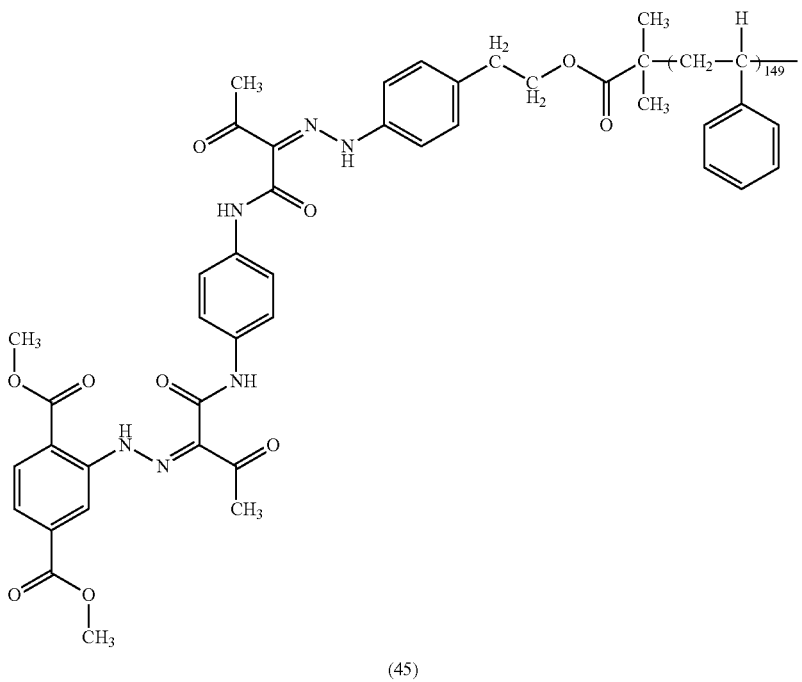

(45)

First, the same operation as that in Production Example of the compound (25) was performed to obtain a compound (85).

Next, 2.00 parts of the compound (88) was added to 20.0 parts of chloroform. The solution was cooled with ice to 10° C. or less, and 0.855 parts of 2-bromoisobutyrylbromide (89) was added. Subsequently, the solution was stirred for 2 hours at 65° C. After the reaction was completed, the reaction product was extracted with chloroform, and condensed to obtain 2.26 parts of an intermediate product (90) (yield of 92.0%).

Next, 0.684 parts of the compound (90), 27.3 parts of styrene (77), 0.305 parts of N,N,N',N'',N''-pentamethyldiethylenetriamine, and 0.124 parts of copper(I) bromide were added to 10.0 parts of N,N-dimethylformamide. Subsequently, under a nitrogen atmosphere, stirring was performed at 100° C. for 7.5 hours. After the reaction was completed, the reaction product was extracted with chloroform, and refined by reprecipitation with methanol to obtain 8.50 parts of a compound (45).

From the measurements using the apparatuses, it was found that the obtained product has the structure represented by the formula above. The results of analysis are shown below.

[Result of Analysis of Compound (45) Having Bisazo Skeleton Unit]

[1] Results of measurement of molecular weight (GPC):
weight average molecular weight (Mw)=15117, number average molecular weight (Mn)=12910

[2] Result of measurement of acid value: 0 mgKOH/g

Figure 2:
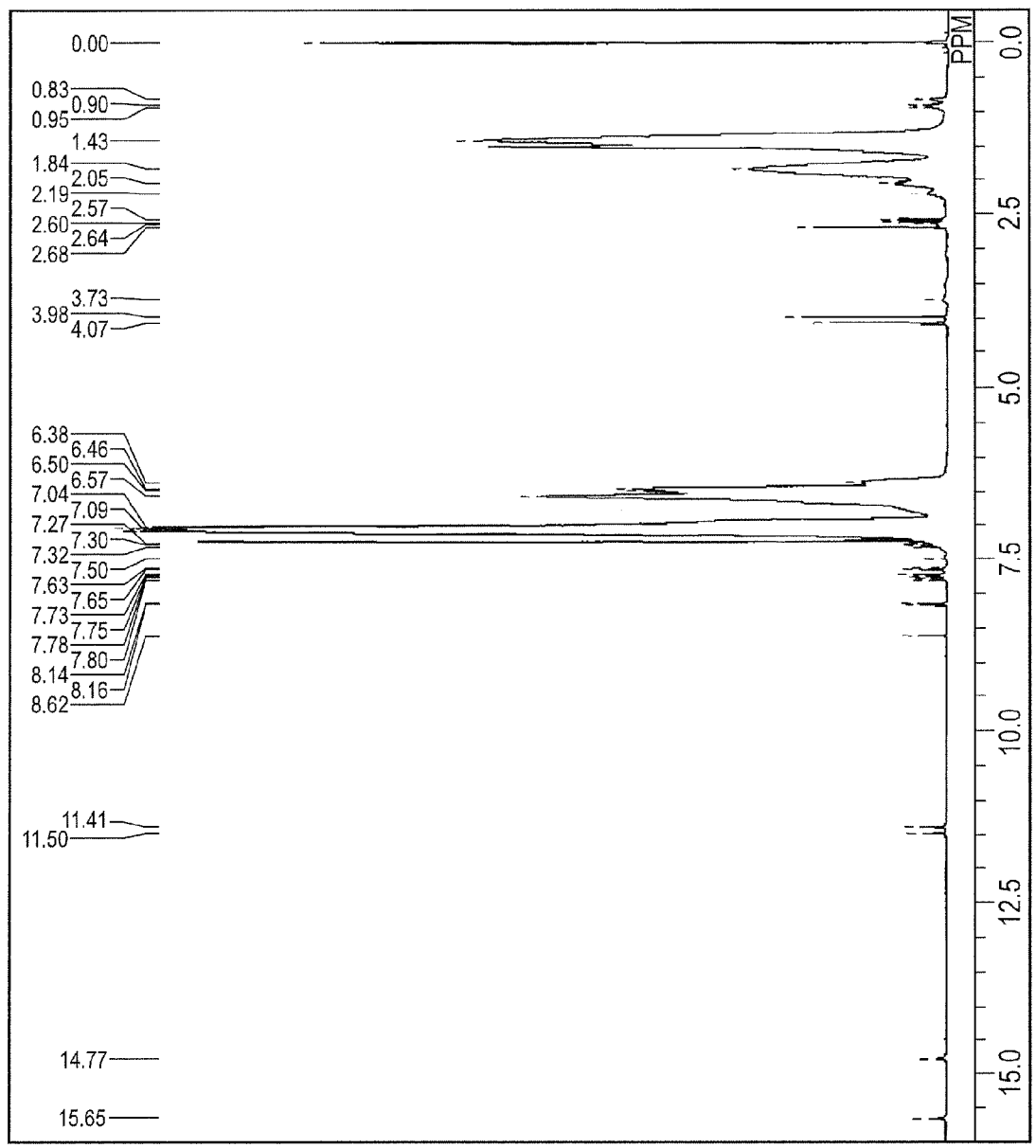
FIG. 2 is a drawing illustrating a $^1$H NMR spectrum at room temperature and 400 MHz of a compound (45) having a bisazo skeleton unit in CDCl$_3$.

[3] Results of $^1$H NMR (400 MHz, CDCl$_3$ at room temperature) (see FIG. 2): δ [ppm]=15.65 (s, 1H), 14.77 (s, 1H), 11.40 (s, 1H), 11.41 (s, 1H), 8.62 (s, 1H), 8.15 (d, 1H), 7.79 (d, 1H), 7.74 (d, 2H), 7.64 (d, 2H), 7.37-6.27 (m, 738H), 4.07 (s, 3H), 3.98 (s, 3H), 3.73 (br, 2H), 2.72-2.52 (m, 9H), 2.47-1.05 (m, 458H), 1.01-0.78 (m, 6H)

The same operation as that in Production Examples of compounds (25) and (45) having the bisazo skeleton unit was performed to produce compounds (26) to (44) and (46) to (76) having the bisazo skeleton unit represented by formula (1) or (2). The compounds having the bisazo skeleton unit according to the present invention are shown in Table 1 below.

TABLE 1

| | | Compound having bisazo skeleton unit according to the present invention | | | | | | | | | | | | | | |
|---|---|---|---|---|---|---|---|---|---|---|---|---|---|---|---|---|
| Compound | Sequential arrangement of monomers | Number of X | Number of Y | Number of Z | Kind of W | Number of W | $R_1$ | $R_2$ | $R_3$ | $R_4$ | $R_5$ | $R_6$ | $R_7$ | $R_8$ | $R_9$ |
| (25) | α-W-polyX | 110 | 0 | 0 | W-1 | 1 | H | H | H | H | CH$_3$ | CH$_3$ | H | COOCH$_3$ | H |
| (26) | α-W-poly(X-co-Y) | 71 | 18 | 0 | W-1 | 1 | H | H | H | H | CH$_3$ | CH$_3$ | H | COOCH$_3$ | H |
| (27) | α-W-poly(X-co-Y) | 43 | 54 | 0 | W-1 | 1 | H | H | H | H | CH$_3$ | CH$_3$ | H | COOCH$_3$ | H |
| (28) | α-W-poly(X-co-Y) | 18 | 88 | 0 | W-1 | 1 | H | H | H | H | CH$_3$ | CH$_3$ | H | COOCH$_3$ | H |
| (29) | α-W-polyY | 0 | 101 | 0 | W-1 | 1 | H | H | H | H | CH$_3$ | CH$_3$ | H | COOCH$_3$ | H |
| (30) | α-W-poly(X-co-Y) | 78 | 23 | 0 | W-1 | 1 | H | H | H | H | CH$_3$ | CH$_3$ | H | COOCH$_3$ | H |
| (31) | α-W-poly(X-co-Y) | 74 | 26 | 0 | W-1 | 1 | H | H | H | H | CH$_3$ | CH$_3$ | H | COOCH$_3$ | H |
| (32) | α-W-poly(X-co-Y) | 51 | 48 | 0 | W-1 | 1 | H | H | H | H | CH$_3$ | CH$_3$ | H | COOCH$_3$ | H |
| (33) | α-W-poly(X-co-Y) | 70 | 29 | 0 | W-1 | 1 | H | H | H | H | CH$_3$ | CH$_3$ | H | COOCH$_3$ | H |
| (34) | α-W-polyX | 99 | 0 | 0 | W-1 | 1 | H | H | H | H | CH$_3$ | CH$_3$ | H | COOCH$_3$ | H |
| (35) | α-W-poly(X-co-Y) | 19 | 87 | 0 | W-1 | 1 | H | H | H | H | CH$_3$ | CH$_3$ | H | COOCH$_3$ | H |
| (36) | α-W-polyX | 100 | 0 | 0 | W-1 | 1 | H | H | H | H | CH$_3$ | CH$_3$ | H | COOCH$_3$ | H |
| (37) | α-W-poly(X-co-Y) | 71.2 | 17 | 0 | W-1 | 1 | H | H | H | H | CH$_3$ | CH$_3$ | H | COOCH$_3$ | H |
| (38) | α-W-poly(X-co-Y) | 72.2 | 18 | 0 | W-1 | 1 | H | H | H | H | CH$_3$ | CH$_3$ | H | COOCH$_3$ | H |
| (39) | α-W-poly(X-co-Y) | 18 | 88 | 0 | W-1 | 1 | H | H | H | H | CH$_3$ | CH$_3$ | H | COOCH$_3$ | H |
| (40) | α-W-polyX | 100 | 0 | 0 | W-1 | 1 | H | H | H | H | CH$_3$ | CH$_3$ | H | COOCH$_3$ | H |
| (41) | α-W-poly(X-co-Y) | 73 | 20 | 0 | W-1 | 1 | H | H | H | H | CH$_3$ | CH$_3$ | H | COOCH$_3$ | H |
| (42) | α-W-polyX | 100 | 0 | 0 | W-1 | 1 | H | H | H | H | CH$_3$ | CH$_3$ | H | COOCH$_3$ | H |
| (43) | α-W-poly(X-co-Y) | 74 | 19 | 0 | W-1 | 1 | H | H | H | H | CH$_3$ | CH$_3$ | H | COOCH$_3$ | H |
| (44) | polyX-blk-W-blk-polyX | 100 | 0 | 0 | W-1 | 1 | H | H | H | H | CH$_3$ | CH$_3$ | H | COOCH$_3$ | H |
| (45) | α-W-polyX | 149 | 0 | 0 | W-1 | 1 | H | H | H | H | CH$_3$ | CH$_3$ | H | COOCH$_3$ | H |
| (46) | α-W-polyX | 434 | 0 | 0 | W-1 | 1 | H | H | H | H | CH$_3$ | CH$_3$ | H | COOCH$_3$ | H |
| (47) | poly(X-co-Y-co-Z-co-W) | 142 | 28 | 6 | W-1 | 5 | H | H | H | H | CH$_3$ | CH$_3$ | H | COOCH$_3$ | H |
| (48) | poly(X-co-Y-co-W) | 141 | 30 | 0 | W-1 | 11 | H | H | H | H | CH$_3$ | CH$_3$ | H | COOCH$_3$ | H |
| (49) | poly(X-co-Y-co-Z-co-W) | 142 | 29 | 9 | W-1 | 2 | H | H | H | H | CH$_3$ | CH$_3$ | H | COOCH$_3$ | H |

TABLE 1-continued

Compound having bisazo skeleton unit according to the present invention

| | R₁₀ | R₁₁ | R₁₉ | R₂₀ | | | | | | | | | | | R₁₅ | R₁₆ | R₁₇ | R₁₈ |
|---|---|---|---|---|---|---|---|---|---|---|---|---|---|---|---|---|---|---|
| (50) | H | 74 | 14 | 1 | Poly(X-co-Y)-blk-poly(Z-co-W) | 1 | H | H | H | CH₃ | CH₃ | H | H | COOCH₃ | H |
| (51) | H | 227 | 0 | 3 | poly(X-co-Z-co-W) | 8 | H | H | H | CH₃ | CH₃ | H | H | COOCH₃ | H |
| (52) | H | 228 | 0 | 3 | poly(X-co-co-W) | 8 | H | H | H | CH₃ | CH₃ | H | H | COOCH₃ | H |
| (53) | H | 84 | 0 | 0 | polyX-blk-polyW | 5 | H | H | H | CH₃ | CH₃ | H | H | COOCH₃ | H |
| (54) | H | 0 | 90 | 2 | poly(X-co-Y-co-W) | 8 | H | H | H | CH₃ | CH₃ | H | H | COOCH₃ | H |
| (55) | H | 10 | 11 | 5 | poly(X-co-Y-co-Z-co-W) | 2 | H | H | H | CH₃ | CH₃ | H | H | COOCH₃ | H |
| (56) | H | 1174 | 0 | 384 | poly(X-co-Z-co-W) | 197 | H | H | H | CH₃ | CH₃ | H | H | COOCH₃ | H |
| (57) | H | 15 | 11 | 0 | poly(X-co-Y-co-W) | 5 | H | H | H | CH₃ | CH₃ | H | H | COOCH₃ | H |
| (58) | H | 16 | 13 | 0 | poly(X-co-W) | 4 | H | H | H | CH₃ | CH₃ | H | H | COOCH₃ | H |
| (59) | H | 140 | 0 | 0 | poly(X-co-Y-co-W) | 1 | H | H | H | C₆H₁₃(n) | Ph | H | H | COOCH₃ | H |
| (60) | H | 145 | 0 | 0 | α-W-polyX | 1 | H | Cl | H | CH₃ | CH₃ | H | H | COOCH₃ | H |
| (61) | H | 146 | 0 | 0 | α-W-polyX | 1 | H | Cl | H | CH₃ | CH₃ | H | H | COOCH₃ | H |
| (62) | H | 151 | 0 | 0 | α-W-polyX | 1 | H | H | H | CH₃ | CH₃ | H | H | COOH | H |
| (63) | H | 149 | 0 | 0 | α-W-polyX | 1 | H | H | H | CH₃ | CH₃ | H | H | COOC₂H₅ | H |
| (64) | H | 152 | 0 | 0 | α-W-polyX | 1 | H | H | H | CH₃ | CH₃ | H | H | COOPr(n) | H |
| (65) | H | 151 | 0 | 0 | α-W-polyX | 1 | H | H | H | CH₃ | CH₃ | H | H | COOPr(i) | H |
| (66) | H | 151 | 0 | 0 | α-W-polyX | 1 | H | H | H | CH₃ | CH₃ | H | H | CONH₂ | H |
| (67) | H | 153 | 0 | 0 | α-W-polyX | 1 | H | H | H | CH₃ | CH₃ | H | H | CONHCH₃ | H |
| (68) | H | 148 | 0 | 0 | α-W-polyX | 1 | H | H | H | CH₃ | CH₃ | H | H | CONHC₂H₅ | H |
| (69) | H | 146 | 0 | 0 | α-W-polyX | 1 | H | H | H | CH₃ | CH₃ | H | H | CONHPr(n) | H |
| (70) | H | 144 | 0 | 0 | α-W-polyX | 1 | H | H | H | CH₃ | CH₃ | H | H | CON(C₂H₅)₂ | H |
| (71) | H | 149 | 0 | 0 | α-W-polyX | 1 | H | H | H | CH₃ | CH₃ | H | H | COOCH₃ | H |
| (72) | H | 149 | 0 | 0 | α-W-polyX | 1 | H | H | H | CH₃ | CH₃ | H | H | H | COOCH₃ |
| (73) | H | 150 | 0 | 0 | α-W-polyX | 1 | H | H | H | CH₃ | CH₃ | H | H | H | H |
| (74) | H | 150 | 0 | 0 | α-W-polyX | 1 | H | H | H | CH₃ | CH₃ | H | H | H | COOCH₃ |
| (75) | H | 152 | 0 | 0 | α-W-polyX | 1 | H | H | H | CH₃ | CH₃ | H | H | COOCH₃ | H |
| (76) | H | 151 | 0 | 0 | α-W-polyX | 1 | H | H | H | CH₃ | CH₃ | H | H | COOCH₃ | H |

| Compound | R₂₁ | | | | R₂₂ | R₂₃ | R₁₅ | R₁₆ | R₁₇ | R₁₈ |
|---|---|---|---|---|---|---|---|---|---|---|
| (25) | Structure 1 | | | | H | H | H | — | — | — |
| (26) | Structure 1 | | | | H | H | H | H | Bu(n) | H |
| (27) | Structure 1 | | | | H | H | H | H | Bu(n) | H |
| (28) | Structure 1 | | | | H | H | — | H | Bu(n) | COOCH₃ |
| (29) | Structure 1 | | | | H | H | H | H | Bu(n) | H |

TABLE 1-continued

| | | | | | Compound having bisazo skeleton unit according to the present invention | | | | | | |
|---|---|---|---|---|---|---|---|---|---|---|---|
| (30) | H | COOCH$_3$ | H | H | Structure 1 | H | H | H | CH$_3$ | Bu(n) | CH$_3$ |
| (31) | H | COOCH$_3$ | H | H | Structure 1 | H | H | H | H | CH$_3$ | H |
| (32) | H | COOCH$_3$ | H | H | Structure 1 | H | H | H | H | CH$_3$ | H |
| (33) | H | COOCH$_3$ | H | H | Structure 1 | H | H | H | H | Bn | H |
| (34) | H | COOCH$_3$ | H | H | Structure 2 | H | CH$_3$ | — | H | — | — |
| (35) | H | COOCH$_3$ | H | H | Structure 2 | H | H | H | H | Bu(n) | H |
| (36) | H | COOCH$_3$ | H | H | Structure 3 | H | H | — | — | — | — |
| (37) | H | COOCH$_3$ | H | H | Structure 3 | H | H | H | H | Bu(n) | H |
| (38) | H | COOCH$_3$ | H | H | Structure 4 | H | H | H | H | Bu(n) | H |
| (39) | H | COOCH$_3$ | H | H | Structure 4 | H | H | H | H | Bu(n) | H |
| (40) | H | COOCH$_3$ | H | H | Structure 5 | H | H | H | H | Bu(n) | H |
| (41) | H | COOCH$_3$ | H | H | Structure 5 | H | H | H | H | Bu(n) | H |
| (42) | H | COOCH$_3$ | H | H | Structure 5 | H | H | H | H | Bu(n) | H |
| (43) | H | COOCH$_3$ | H | H | Structure 5 | H | H | H | H | Bu(n) | H |
| (44) | H | COOCH$_3$ | H | NHCOC$_2$H$_4$S—* | H | NHCOC$_2$H$_4$S—* | H | H | — | — | — |
| (45) | H | COOCH$_3$ | H | H | Structure 6 | H | H | H | — | — | — |
| (46) | H | COOCH$_3$ | H | H | Structure 6 | H | H | H | — | — | — |
| (47) | H | COOCH$_3$ | H | H | Structure 6 | H | H | H | H | Bu(n) | H |
| (48) | H | COOCH$_3$ | H | H | Structure 6 | H | H | H | H | Bu(n) | H |
| (49) | H | COOCH$_3$ | H | H | Structure 6 | H | H | H | — | Bu(n) | H |
| (50) | H | COOCH$_3$ | H | H | Structure 6 | H | H | H | H | Bu(n) | H |
| (51) | H | COOCH$_3$ | H | H | Structure 6 | H | H | H | — | — | — |
| (52) | H | COOCH$_3$ | H | H | Structure 6 | H | H | H | — | — | — |
| (53) | H | COOCH$_3$ | H | H | Structure 6 | H | — | H | H | — | H |
| (54) | H | COOCH$_3$ | H | H | Structure 6 | H | H | H | H | Bu(n) | H |

TABLE 1-continued

Compound having bisazo skeleton unit according to the present invention

| | | | | | | | | | | |
|---|---|---|---|---|---|---|---|---|---|---|
| (55) | H | COOCH₃ | H | H | Structure 6 | H | H | H | Bu(n) | H |
| (56) | H | COOCH₃ | H | H | Structure 7 | H | H | — | — | CH₃ |
| (57) | H | COOCH₃ | H | H | Structure 6 | CH₃ | CH₃ | CH₃ | CH₃ | H |
| (58) | H | COOCH₃ | H | H | Structure 6 | CH₃ | CH₃ | CH₃ | Bn | H |
| (59) | H | COOCH₃ | H | H | Structure 6 | H | H | — | — | — |
| (60) | H | COOCH₃ | H | H | Structure 6 | H | H | — | — | — |
| (61) | H | COOH | H | H | Structure 6 | H | H | — | — | — |
| (62) | H | COOC₂H₅ | H | H | Structure 6 | H | H | — | — | — |
| (63) | H | COOPr(n) | H | H | Structure 6 | H | H | — | — | — |
| (64) | H | COOPr(i) | H | H | Structure 6 | H | H | — | — | — |
| (65) | H | CONH₂ | H | H | Structure 6 | H | H | — | — | — |
| (66) | H | CONHCH₃ | H | H | Structure 6 | H | H | — | — | — |
| (67) | H | CONHC₂H₅ | H | H | Structure 6 | H | H | — | — | — |
| (68) | H | CONHPr(n) | H | H | Structure 6 | H | H | — | — | — |
| (69) | H | CON(C₂H₅)₂ | H | H | Structure 6 | H | H | — | — | — |
| (70) | H | H | H | H | Structure 6 | H | H | — | — | — |
| (71) | H | H | H | H | Structure 6 | H | H | — | — | — |
| (72) | H | H | H | H | Structure 6 | H | H | — | — | — |
| (73) | COOCH₃ | H | H | H | Structure 6 | H | H | — | — | — |
| (74) | H | COOCH₃ | H | H | Structure 6 | H | H | — | — | — |
| (75) | H | COOCH₃ | H | H | Structure 6 | H | H | — | — | — |
| (76) | H | COOCH₃ | H | H | Structure 6 | H | H | — | — | — |

[wherein X represents formula (3), Y represents formula (4), and Z, W-1, W-2, and W-3 represent the structures below; "Pr" represents an unsubstituted propyl group, "Bu" represents an unsubstituted butyl group, "Ph" represents an unsubstituted phenyl group, "Bn" represents an unsubstituted benzyl group, (n) represents a linear alkyl group, and (i) represents a branched alkyl group.]

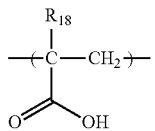

(Z)

[wherein $R_{18}$ represents a hydrogen atom or an alkyl group.]

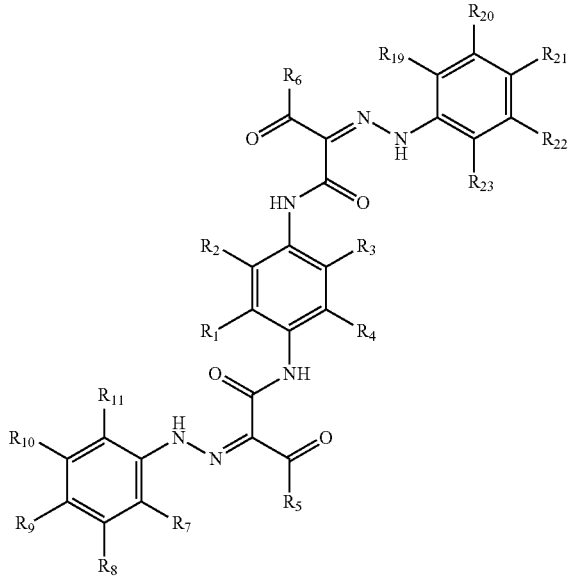

(W-1), (W-2)

[wherein the linking group $L_1$ is bonded to one of $R_{19}$ to $R_{23}$, and the number of $L_1$ is one or two.]

[wherein the linking group $L_1$ is bonded to one of $R_{19}$ to $R_{23}$, and the number of $L_1$ is one or two.]

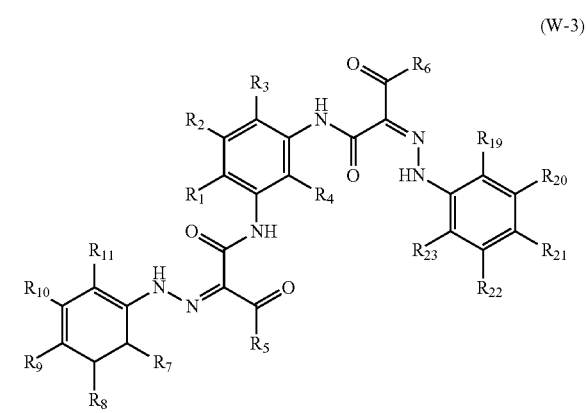

(W-3)

[wherein the linking group $L_1$ is bonded to one of $R_{19}$ to $R_{23}$, and the number of $L_1$ is one or two.]

The above structures 1 to 7 are as follows:

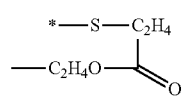

Structure 1

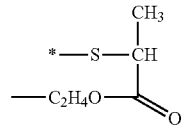

Structure 2

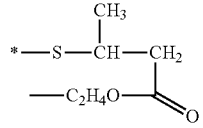

Structure 3

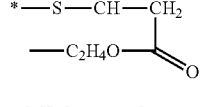

Structure 4

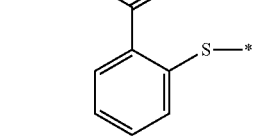

Structure 5

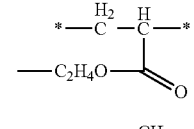

Structure 6

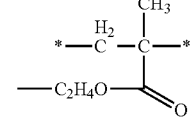

Structure 7 wherein "*" represents a bonding site to the polymer resin unit.

COMPARATIVE PRODUCTION EXAMPLES

As Comparative Examples of the bisazo skeleton unit represented by formula (1) or formula (2), azo skeleton units for comparison represented by formulas (91) and (92) were produced according to the production method. Then, the amino group in the unit and the carboxyl group in the polymer resin unit (79) according to Production Example of the compound (25) were amidated to obtain compounds for comparison (91) and (92).

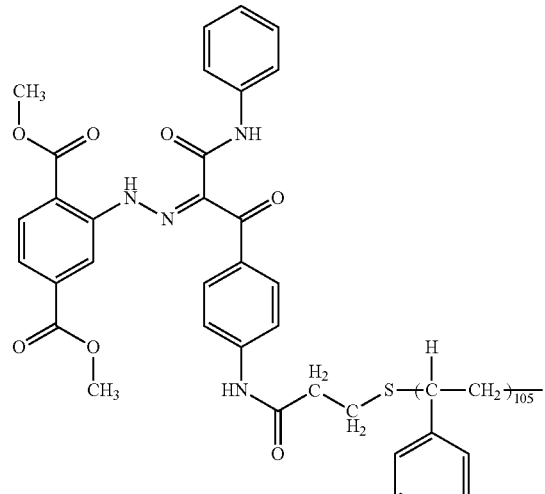

Formula (91)

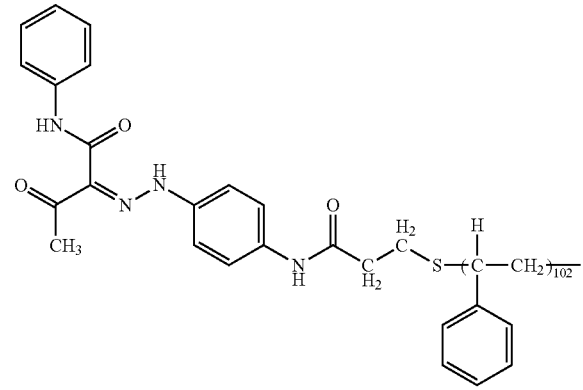

Formula (92)

Preparation Examples of Pigment Dispersion Liquid

First, using the method below, a pigment dispersion liquid including a pigment and the compound having the bisazo skeleton unit in the process of producing a toner by the suspension polymerization method was prepared.

Preparation Example 1 of Pigment Dispersion Liquid 18.0 parts of the pigment represented by formula (6) as the azo pigment, 5.4 parts of the compound (25) having the bisazo skeleton unit, 180 parts of styrene as the water-insoluble solvent, and 130 parts of glass beads (diameter of 1 mm) were mixed, and dispersed for 3 hours by an Attritor [made by NIPPON COKE & ENGINEERING CO., LTD.]. The solution was filtered with a mesh to obtain a pigment dispersion liquid (DIS1).

Preparation Example 2 of Pigment Dispersion Liquid

The same operation was performed except that the compounds (26) to (76) having the bisazo skeleton unit were used instead of the compound (25) having the bisazo skeleton unit in Preparation Example 1 of the pigment dispersion liquid. Thus, pigment dispersion liquids (DIS2) to (DIS52) were obtained.

Preparation Example 3 of Pigment Dispersion Liquid

The same operation was performed except that the pigments represented by formulas (93) and (94) were used instead of the pigment represented by formula (6) in Preparation Example 1 of the pigment dispersion liquid. Thus, pigment dispersion liquids (DIS53) and (DIS54) were obtained.

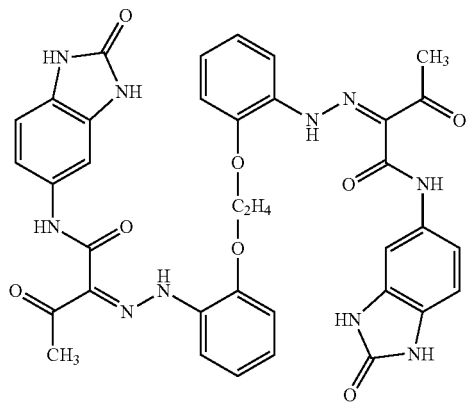

Formula (93)

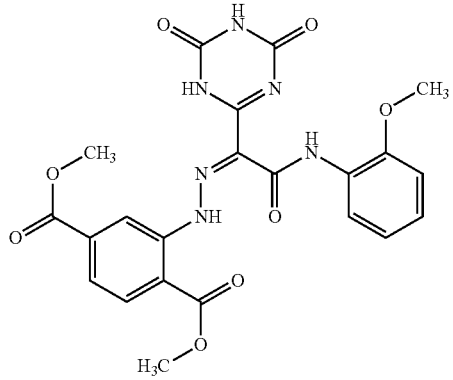

Formula (94)

Preparation Examples of Pigment Dispersion Liquid for Reference and Pigment Dispersion Liquid for Comparison A pigment dispersion liquid for giving a reference value in evaluation and a pigment dispersion liquid for comparison were prepared by the following method.

Preparation Example 1 of Pigment Dispersion Liquid for Reference

The same operation was performed except that the compound (25) having the bisazo skeleton unit in Preparation Example 1 of the pigment dispersion liquid was not added. Thus, a pigment dispersion liquid for reference (DIS55) was obtained.

Preparation Example 2 of Pigment Dispersion Liquid for Reference

The same operation was performed except that the compound (25) having the bisazo skeleton unit in Preparation Example 3 of the pigment dispersion liquid was not added. Thus, pigment dispersion liquids for reference (DIS56) and (DIS57) were obtained.

Preparation Example 1 of Pigment Dispersion Liquid for Comparison

The same operation was performed except that polymer dispersant Solsperse 24000SC (registered trademark) described in WO 99/42532 [made by Lubrizol Corporation], and the compounds for comparison (93) and (94) were used instead of the compound (25) having the bisazo skeleton unit in Preparation Example 1 of the pigment dispersion liquid. Thus, pigment dispersion liquids for comparison (DIS58) to (DIS60) were obtained.

[Evaluation of Pigment Dispersion Liquid]

The pigment dispersion liquids were evaluated according to the following methods.

<Evaluation of Viscosity of Pigment Dispersion Liquid>

In the pigment dispersion liquids (DIS1) to (DIS60), the viscosity was measured at a shear rate of 10 s$^{-1}$ using a rheometer Physica MCR300 [made by Anton Paar GmbH, corn plate type measurement jig: diameter of 75 mm, 1°]. The viscosity of the pigment dispersion liquid was evaluated according to the criterion below.

A: less than 500 mPa·s
B: not less than 500 mPa·s and less than 1000 mPa·s
C: not less than 1000 mPa·s and less than 2000 mPa·s
D: not less than 2000 mPa·s Here, at a viscosity less than 1000 mPa·s, it was determined that the dispersibility of the pigment in the pigment dispersion liquid was good, and the viscosity was sufficiently reduced.

The result of evaluation of the viscosity of the pigment dispersion liquid is shown in Table 2.

Production Examples of Toner

Next, the toner according to the present invention produced by the suspension polymerization method was produced by the following method.

Production Example 1 of Toner 710 parts of ion exchange water and 450 parts of a 0.1 mol/l-Na$_3$PO$_4$ aqueous solution were placed in a 2 L four-necked flask including a high speed stirrer T.K. homomixer [made by PRIMIX Corporation]. The number of rotation was adjusted to 12000 rpm, and the solution was heated to 60° C. 68 parts of a 1.0 mol/l-CaCl$_2$ aqueous solution was gradually added thereto to prepare an aqueous medium containing a fine poorly water-soluble dispersion stabilizer Ca$_3$(PO$_4$)$_2$. Next, the composition was heated to 60° C., and uniformly dissolved or dispersed at 5000 rpm using the high speed stirrer T.K. homomixer [made by PRIMIX Corporation].

| | |
|---|---|
| the pigment dispersion liquid (DIS1) | 132 parts |
| styrene monomer | 46 parts |
| n-butyl acrylate monomer | 34 parts |
| polar resin [saturated polyester resin (terephthalic acid-propylene oxide modified bisphenol A, acid value of 15, peak molecular weight of 6000)] | 10 parts |
| ester wax (largest endothermic peak in DSC measurement = 70° C., Mn = 704) | 25 parts |
| aluminum salicylate compound [made by ORIENT CHEMICAL INDUSTRIES CO., LTD., trade name: BONTRON E-88] | 2 parts |
| divinylbenzene monomer | 0.1 parts |

10 parts of 2,2'-azobis(2,4-dimethylvaleronitrile) as the polymerization initiator was added to the dispersion liquid. The dispersion liquid was poured into the aqueous medium, and granulation was performed for 15 minutes while the number of rotation was kept at 12000 rpm. Then the high speed stirrer was replaced by a propeller stirring blade, and the polymerization was continued for 5 hours at the solution temperature of 60° C. Then, the solution temperature was raised to 80° C., and the polymerization was continued for 8 hours. After the polymerization reaction was completed, the remaining monomer was removed at 80° C. under reduced pressure. Then, the temperature was cooled to 30° C. to obtain a polymer fine particle dispersion liquid.

The obtained polymer fine particle dispersion liquid was placed in a washing container. While the polymer fine particle dispersion liquid was stirred, diluted hydrochloric acid was added. At a pH of 1.5, the dispersion liquid was stirred for 2 hours, and a compound of phosphoric acid and calcium containing Ca$_3$(PO$_4$)$_2$ was dissolved. Then, solid liquid separation was performed using a filter to obtain a polymer fine particle. The polymer fine particle was added to water, and a dispersion liquid was again prepared by stirring. Then, the dispersion liquid was subjected to solid liquid separation with a filter. Re-dispersion of the polymer fine particle in water and solid liquid separation were repeated until a compound of phosphoric acid and calcium containing Ca$_3$(PO$_4$)$_2$ was sufficiently removed. Subsequently, the polymer fine particle obtained by the final solid liquid separation was sufficiently dried by a dryer to obtain a toner base particle.

1.0 part of hydrophobic silica fine powder surface treated with hexamethyldisilazane (the number average diameter of the primary particle of 7 nm), 0.15 parts of rutile titanium oxide fine powder (the number average diameter of the primary particle of 45 nm), and 0.5 parts of rutile titanium oxide fine powder (the number average diameter of the primary particle of 200 nm) were dry mixed based on 100 parts of the obtained toner base particles using a Henschel mixer [made by NIPPON COKE & ENGINEERING CO., LTD.] for 5 minutes to obtain a toner (TNR1).

Production Example 2 of Toner

Toners according to the present invention (TNR2) to (TNR52) were obtained in the same manner as in Production Example 1 of the toner except that pigment dispersion liquids (DIS2) to (DIS52) were used instead of the pigment dispersion liquid (DIS1) in Production Example 1 of the toner.

Production Example 3 of Toner

The toners according to the present invention (TNR53) and (TNR54) were obtained in the same manner as in Production Example 1 of the toner except that pigment dispersion liquids (DIS53) and (DIS54) were used instead of the pigment dispersion liquid (DIS1) in Production Example 1 of the toner.

Production Example 4 of Toner

Next, the toner according to the present invention produced by the suspension granulation method was produced by the following method.

180 parts of ethyl acetate, 12 parts of the pigment represented by formula (6), 2.4 parts of the compound (25) having the bisazo skeleton unit, and 130 parts of glass beads (diameter of 1 mm) were mixed, and dispersed for 3 hours by an Attritor [made by NIPPON COKE & ENGINEERING CO., LTD.]. The solution was filtered with a mesh to prepare a pigment dispersion liquid.

The composition was dispersed for 24 hours by a ball mill to obtain 200 parts of a toner composition mixed solution.

| | |
|---|---|
| the pigment dispersion liquid | 96.0 parts |
| polar resin | 85.0 parts |
| [saturated polyester resin (polycondensate of propylene oxide modified bisphenol A and phthalic acid, Tg = 75.9° C., Mw = 11000, Mn = 4200, acid value of 11)] | |
| hydrocarbon wax | 9.0 parts |
| (Fischer-Tropsch wax, largest endothermic peak in DSC measurement = 80° C., Mw = 750) | |
| aluminum salicylate compound | 2 parts |
| [BONTRON E-88, made by ORIENT CHEMICAL INDUSTRIES CO., LTD.] | |
| ethyl acetate (solvent) | 10.0 parts |

The composition was dispersed for 24 hours by a ball mill to dissolve carboxymethyl cellulose. Thereby, an aqueous medium was obtained.

| | |
|---|---|
| calcium carbonate (coated with acrylic acid copolymer) | 20.0 parts |
| carboxymethyl cellulose [Celogen BS-H, made by Dai-ichi Kogyo Seiyaku Co., Ltd.] | 0.5 parts |
| ion exchange water | 99.5 parts |

1200 parts of the aqueous medium was placed in a high speed stirrer T.K. homomixer [made by PRIMIX Corporation]. While the aqueous medium was stirred with a rotary blade at a circumferential speed of 20 m/sec, 1000 parts of the toner composition mixed solution was added. While the temperature was kept constant at 25° C., the aqueous medium was stirred for 1 minute. Thereby, a suspension was obtained.

While 2200 parts of the suspension was stirred with a FULLZONE Impeller [made by Kobelco Eco-Solutions Co., Ltd.] at a circumferential speed of 45 m/min, the solution temperature was kept constant at 40° C., and the gaseous phase on the surface of the suspension was forcibly sucked using a blower to start removal of the solvent. At this time, after 15 minutes since removal of the solvent was started, 75 parts of aqueous ammonia diluted to 1% was added as an ionic substance. Subsequently, after 1 hour since removal of the solvent was started, 25 parts of the aqueous ammonia was added. Subsequently, after 2 hours since removal of the solvent was started, 25 parts of the aqueous ammonia was added. Finally, after 3 hours since removal of the solvent was started, 25 parts of the aqueous ammonia was added. The total amount of aqueous ammonia to be added was 150 parts. Further, the solution temperature was kept at 40° C. for 17 hours since removal of the solvent was started. Thus, a toner dispersion liquid was obtained in which the solvent (ethyl acetate) was removed from the suspended particle.

80 parts of 10 mol/l hydrochloric acid was added to 300 parts of the toner dispersion liquid obtained in the solvent removing step. Further, neutralization was performed with a 0.1 mol/l sodium hydroxide aqueous solution. Then, washing with ion exchange water by suction filtration was repeated four times to obtain a toner cake. The obtained toner cake was dried with a vacuum dryer, and sieved with a sieve having an opening of 45 μm to obtain toner base particles. The operation subsequent to this was performed in the same manner as in Production Example 1 of the toner to obtain a toner (TNR61).

Production Example 5 of Toner

The same operation was performed as in Production Example 4 of the toner except that the compounds (26) to (76) were used instead of the compound (25) having the bisazo skeleton unit. Thus, toners according to the present invention (TNR61) to (TNR112) were obtained.

Production Example 6 of Toner

Toners according to the present invention (TNR113) and (TNR114) were obtained in the same manner as in Production Example 5 of the toner except that the pigments represented by formulas (93) and (94) were used instead of the pigment represented by formula (6).

Production Example 1 of Toner for Reference

Toner for reference (TNR55) was obtained in the same manner as in Production Example 1 of the toner except that the compound (25) having the bisazo skeleton unit was not added.

Production Example 2 of Toner for Reference

Toners for reference (TNR56) and (TNR57) were obtained in the same manner as in Production Example 3 of the toner except that the compound (25) having the bisazo skeleton unit was not added.

Production Example 1 of Toner for Comparison

Toners for comparison (TNR58) to (TNR60) were obtained in the same manner as in Production Example 1 of the toner except that Solsperse 24000SC (registered trademark) [made by Lubrizol Corporation], and the compounds (93) and (94) were used instead of the compound (25) having the bisazo skeleton unit.

Production Example 3 of Toner for Reference

A toner for reference (TNR115) was obtained in the same manner as in Production Example 4 of the toner except that the compound (25) having the bisazo skeleton unit was not added.

Production Example 4 of Toner for Reference

Toners for reference (TNR116) and (TNR117) were obtained in the same manner as in Production Example 6 of the toner except that the compound (25) having the bisazo skeleton unit was not added.

Production Example 2 of Toner for Comparison

Toners for comparison (TNR118) to (TNR120) were obtained in the same manner as in Production Example 4 of the toner except that Solsperse 24000SC (registered trademark) [made by Lubrizol Corporation], and the compounds (93) and (94) were used instead of the compound (25) having the bisazo skeleton unit.

The toners were evaluated according to the following methods.

Using the toners (TNR1) to (TNR57) and (TNR61) to (TNR117), image samples were output, and image properties described later were compared and evaluated. In comparison of the image properties, a modified machine of an LBP-5300 (made by Canon Inc.) was used as an image forming apparatus. In modification, the developing blade within the process cartridge (hereinafter, referred to as a CRG) was replaced by an SUS blade having a thickness of 8 μm. Moreover, modification was made such that a blade bias of −200 V could be applied to the developing bias to be applied to the developing roller as a toner carrier.

<Evaluation of Color Tone of Toner>

Under a normal temperature and normal humidity (N/N (23.5° C., 60% RH)) environment, a solid image was formed on a transfer paper (75 g/m² paper) at an amount of the toner to be applied of 0.5 mg/cm². In the image, L* and C* in the L*a*b* color system specified by CIE (Commission Internationale de l'Eclairage) were measured by a reflection densitometer Spectrolino [made by Gretag Macbeth GmbH] on the condition of the light source: D50 and the view: 2°. The color tone of the toner was evaluated using an improvement rate of C* at L*=95.5.

The improvement rate of C* in the images formed using the toners (TNR1) to (TNR54) was evaluated wherein the C* in the images formed using the toners for reference (TNR55) to (TNR57) was the reference value.

The improvement rate of C* in the images formed using the toners (TNR61) to (TNR114) was evaluated wherein the C* in the images formed using the toners for reference (TNR115) to (TNR117) was the reference value.

The criterion for evaluation of the improvement rate of C* is shown below:

A: the improvement rate of C* is not less than 5%
B: the improvement rate of C* is not less than 1% and less than 5%
C: the improvement rate of C* is less than 1%
D: C* is reduced If the improvement rate of C* was not less than 1%, it was determined that the color tone was good.

The result of evaluation of the color tone of the toners according to the present invention produced by the suspension polymerization method is shown in Table 2, and the result of evaluation of the color tone of the toners produced by the suspension granulation method is shown in Table 3.

<Evaluation of Image Fogging of Toner>

Under a normal temperature and normal humidity (N/N (23.5° C., 60% RH)) environment and a high temperature and high humidity (H/H (30° C., 80% RH)) environment, using a 75 g/m² transfer paper, 10,000 sheets of an image having a coverage rate of 2% were printed out. In this image print out test, an image having a blank portion was output after the durability evaluation was completed. Using a "REFLECT-METER MODEL TC-6DS" (made by Tokyo Denshoku Co., Ltd.), the whiteness of the blank portion in the print out image (reflectance Ds (%)) and the whiteness of the transfer paper (average reflectance Dr (%)) were measured. From the difference between Ds and Dr, the fogging concentration (%) (=Dr (%)−Ds (%)) was calculated, and the image fogging after the durability evaluation was completed was evaluated. A blue light filter was used.

A: less than 1.0%
B: not less than 1.0% and less than 3.0%
C: not less than 3.0% and less than 5.0%
D: not less than 5.0%

If the fogging concentration was less than 5%, it was determined that the fogging concentration had no practical problem.

The result of evaluation of the image fogging caused by the toners according to the present invention produced by the suspension polymerization method is shown in Table 2, and the result of evaluation of the image fogging caused by the toners produced by the suspension granulation method is shown in Table 3.

<Evaluation of Transfer Efficiency of Toner>

Under a high temperature and high humidity (H/H (30° C., 80% RH)) environment, using a 75 g/m² transfer paper, 10,000 sheets of an image having a coverage rate of 2% were printed out. In this image print out test, the transfer efficiency was checked when the durability evaluation was completed. A solid image at an amount of the toner to be applied of 0.65 mg/cm² was developed on a drum. Then, the solid image was transferred onto a transfer paper (75 g/m² paper) to obtain a non-fixed image. The transfer efficiency was determined from the amount of the toner on the drum and the amount of the toner on the transfer paper as change in the weight (the transfer efficiency is 100% when the total amount of the toner on the drum is transferred onto the transfer paper.)

A: the transfer efficiency is not less than 90%
B: the transfer efficiency is not less than 80% and less than 90%
C: the transfer efficiency is not less than 70% and less than 80%
D: the transfer efficiency is less than 70%

If the transfer efficiency was not less than 70%, it was determined that the transfer efficiency was good.

The result of evaluation of the transfer efficiency of the toners according to the present invention produced by the suspension polymerization method is shown in Table 2, and the result of evaluation of the transfer efficiency of the toners produced by the suspension granulation method is shown in Table 3.

In the toners for comparison (TNR58) to (TNR60) and (TNR118) to (TNR120), the color tone, the image fogging, and the transfer efficiency were evaluated by the methods above.

The improvement rate of C* in the images formed using the toners for comparison (TNR58) to (TNR60) was evaluated wherein the C in the image formed using the toner for reference (TNR55) was the reference value.

The improvement rate of C* in the images formed using the toners for comparison (TNR118) to (TNR120) was evaluated wherein the C in the image formed using the toner for reference (TNR115) was the reference value.

The results of evaluation of the toners for comparison produced by the suspension polymerization method are shown in Table 2, and the results of evaluation of the toners for comparison produced by the suspension granulation method are shown in Table 3.

TABLE 2

Results of evaluation of toners according to the present invention produced by suspension polymerization

| Toner | Pigment dispersion liquid | Compound | Pigment | Evaluation of viscosity | Evaluation of color | Image fogging(N/N) | Image fogging(H/H) | Transfer properties |
|---|---|---|---|---|---|---|---|---|
| (TNR1) | (DIS1) | (25) | (6) | A(212) | A | A | A | A |
| (TNR2) | (DIS2) | (26) | (6) | A(299) | A | A | A | A |
| (TNR3) | (DIS3) | (27) | (6) | A(356) | A | A | A | A |
| (TNR4) | (DIS4) | (28) | (6) | A(378) | A | A | A | A |
| (TNR5) | (DIS5) | (29) | (6) | A(410) | A | A | A | A |
| (TNR6) | (DIS6) | (30) | (6) | A(298) | A | A | A | A |
| (TNR7) | (DIS7) | (31) | (6) | A(301) | A | A | A | A |
| (TNR8) | (DIS8) | (32) | (6) | A(340) | A | A | A | A |
| (TNR9) | (DIS9) | (33) | (6) | A(305) | A | A | A | A |
| (TNR10) | (DIS10) | (34) | (6) | A(214) | A | A | A | A |
| (TNR11) | (DIS11) | (35) | (6) | A(381) | A | A | A | A |
| (TNR12) | (DIS12) | (36) | (6) | A(206) | A | A | A | A |
| (TNR13) | (DIS13) | (37) | (6) | A(295) | A | A | A | A |
| (TNR14) | (DIS14) | (38) | (6) | A(293) | A | A | A | A |
| (TNR15) | (DIS15) | (39) | (6) | A(378) | A | A | A | A |
| (TNR16) | (DIS16) | (40) | (6) | A(220) | A | A | A | A |
| (TNR17) | (DIS17) | (41) | (6) | A(296) | A | A | A | A |
| (TNR18) | (DIS18) | (42) | (6) | A(198) | A | A | A | A |
| (TNR19) | (DIS19) | (43) | (6) | A(296) | A | A | A | A |
| (TNR20) | (DIS20) | (44) | (6) | A(211) | A | A | A | A |
| (TNR21) | (DIS21) | (45) | (6) | A(148) | A | A | A | A |
| (TNR22) | (DIS22) | (46) | (6) | A(93) | A | A | A | A |
| (TNR23) | (DIS23) | (47) | (6) | A(168) | A | A | A | A |
| (TNR24) | (DIS24) | (48) | (6) | A(178) | A | A | A | A |
| (TNR25) | (DIS25) | (49) | (6) | A(175) | A | A | A | A |
| (TNR26) | (DIS26) | (50) | (6) | A(288) | A | A | A | A |
| (TNR27) | (DIS27) | (51) | (6) | A(118) | A | A | A | A |
| (TNR28) | (DIS28) | (52) | (6) | A(118) | A | A | A | A |
| (TNR29) | (DIS29) | (53) | (6) | A(278) | A | A | A | A |
| (TNR30) | (DIS30) | (54) | (6) | A(414) | A | A | A | A |
| (TNR31) | (DIS31) | (55) | (6) | A(498) | A | A | A | A |
| (TNR32) | (DIS32) | (56) | (6) | A(101) | A | A | A | A |
| (TNR33) | (DIS33) | (57) | (6) | A(488) | A | A | A | A |
| (TNR34) | (DIS34) | (58) | (6) | A(487) | A | A | A | A |
| (TNR35) | (DIS35) | (59) | (6) | B(588) | B | B | B | B |
| (TNR36) | (DIS36) | (60) | (6) | A(145) | A | A | A | A |
| (TNR37) | (DIS37) | (61) | (6) | B(582) | B | B | B | B |
| (TNR38) | (DIS38) | (62) | (6) | A(143) | A | A | A | A |
| (TNR39) | (DIS39) | (63) | (6) | B(648) | B | B | B | B |
| (TNR40) | (DIS40) | (64) | (6) | B(630) | B | B | B | B |
| (TNR41) | (DIS41) | (65) | (6) | B(624) | B | B | B | B |
| (TNR42) | (DIS42) | (66) | (6) | B(599) | B | B | B | B |
| (TNR43) | (DIS43) | (67) | (6) | B(617) | B | B | B | B |
| (TNR44) | (DIS44) | (68) | (6) | B(602) | B | B | B | B |
| (TNR45) | (DIS45) | (69) | (6) | B(625) | B | B | B | B |
| (TNR46) | (DIS46) | (70) | (6) | B(654) | B | B | B | B |
| (TNR47) | (DIS47) | (71) | (6) | B(631) | B | B | B | B |
| (TNR48) | (DIS48) | (72) | (6) | B(614) | B | B | B | B |
| (TNR49) | (DIS49) | (73) | (6) | B(611) | B | B | B | B |
| (TNR50) | (DIS50) | (74) | (6) | B(620) | B | B | B | B |
| (TNR51) | (DIS51) | (75) | (6) | A(145) | A | A | A | A |
| (TNR52) | (DIS52) | (76) | (6) | A(160) | A | A | A | A |
| (TNR53) | (DIS53) | (25) | (93) | B(796) | B | B | B | B |
| (TNR54) | (DIS54) | (25) | (94) | B(813) | B | B | B | B |
| (TNR55) | (DIS55) | None | (6) | D(2221) | C | C | C | C |
| (TNR56) | (DIS56) | None | (93) | C(1850) | C | C | C | C |
| (TNR57) | (DIS57) | None | (94) | C(1622) | C | C | C | C |
| (TNR58) | (DIS58) | Solsperse 24000SC | (6) | D(2183) | D | D | D | D |
| (TNR59) | (DIS59) | (91) | (6) | D(2500) | D | D | D | D |
| (TNR60) | (DIS60) | (92) | (6) | D(2071) | D | D | D | D |

[the numeric value within the brackets in Evaluation of viscosity represents a value of viscosity (unit: mPa·s).]

TABLE 3

Results of evaluation of toners according to the present invention produced by suspension granulation

| Toner | Compound | Pigment | Evaluation of color | Image fogging (N/N) | Image fogging (H/H) | Transfer properties |
|---|---|---|---|---|---|---|
| (TNR61) | (25) | (6) | A | A | A | A |
| (TNR62) | (26) | (6) | A | A | A | A |
| (TNR63) | (27) | (6) | A | A | A | A |
| (TNR64) | (28) | (6) | A | A | A | A |
| (TNR65) | (29) | (6) | A | A | A | A |
| (TNR66) | (30) | (6) | A | A | A | A |
| (TNR67) | (31) | (6) | A | A | A | A |
| (TNR68) | (32) | (6) | A | A | A | A |
| (TNR69) | (33) | (6) | A | A | A | A |
| (TNR70) | (34) | (6) | A | A | A | A |
| (TNR71) | (35) | (6) | A | A | A | A |
| (TNR72) | (36) | (6) | A | A | A | A |
| (TNR73) | (37) | (6) | A | A | A | A |
| (TNR74) | (38) | (6) | A | A | A | A |
| (TNR75) | (39) | (6) | A | A | A | A |
| (TNR76) | (40) | (6) | A | A | A | A |
| (TNR77) | (41) | (6) | A | A | A | A |
| (TNR78) | (42) | (6) | A | A | A | A |
| (TNR79) | (43) | (6) | A | A | A | A |
| (TNR80) | (44) | (6) | A | A | A | A |
| (TNR81) | (45) | (6) | A | A | A | A |
| (TNR82) | (46) | (6) | A | A | A | A |
| (TNR83) | (47) | (6) | A | A | A | A |
| (TNR84) | (48) | (6) | A | A | A | A |
| (TNR85) | (49) | (6) | A | A | A | A |
| (TNR86) | (50) | (6) | A | A | A | A |
| (TNR87) | (51) | (6) | A | A | A | A |
| (TNR88) | (52) | (6) | A | A | A | A |
| (TNR89) | (53) | (6) | A | A | A | A |
| (TNR90) | (54) | (6) | A | A | A | A |
| (TNR91) | (55) | (6) | A | A | A | A |
| (TNR92) | (56) | (6) | A | A | A | A |
| (TNR93) | (57) | (6) | A | A | A | A |
| (TNR94) | (58) | (6) | A | A | A | A |
| (TNR95) | (59) | (6) | B | B | B | B |
| (THR96) | (60) | (6) | A | A | A | A |
| (TNR97) | (61) | (6) | B | B | B | B |
| (TNR98) | (62) | (6) | A | A | A | A |
| (TNR99) | (63) | (6) | B | B | B | B |
| (TNR100) | (64) | (6) | B | B | B | B |
| (TNR101) | (65) | (6) | B | B | B | B |
| (TNR102) | (66) | (6) | B | B | B | B |
| (TNR103) | (67) | (6) | B | B | B | B |
| (TNR104) | (68) | (6) | B | B | B | B |
| (TNR105) | (69) | (6) | B | B | B | B |
| (TNR106) | (70) | (6) | B | B | B | B |
| (TNR107) | (71) | (6) | B | B | B | B |
| (TNR108) | (72) | (6) | B | B | B | B |
| (TNR109) | (73) | (6) | B | B | B | B |
| (TNR110) | (74) | (6) | B | B | B | B |
| (TNR111) | (75) | (6) | A | A | A | A |
| (TNR112) | (76) | (6) | A | A | A | A |
| (TNR113) | (25) | (93) | B | B | B | B |
| (TNR114) | (25) | (94) | B | B | B | B |
| (TNR115) | None | (6) | C | C | C | C |
| (TNR116) | None | (93) | C | C | C | C |
| (TNR117) | None | (94) | C | C | C | C |
| (TNR118) | Solsperse 24000SC | (6) | D | D | D | D |
| (TNR119) | (91) | (6) | D | D | D | D |
| (TNR120) | (92) | (6) | D | D | D | D |

Apparently from Table 2, it was found that use of the compound having the bisazo skeleton unit provides a toner having improved dispersibility of the azo pigment in the binder resin and a good color tone. It was also found that use of the compound having the bisazo skeleton unit provides a toner having high transfer efficiency in which image fogging is suppressed. Further, it was found that use of the compound having the bisazo skeleton unit provides a toner obtained by the production method in which in the process of producing a toner using the azo pigment, dispersion stability of the pigment dispersion liquid is improved and increase in the viscosity of the pigment dispersion liquid is suppressed. Moreover, apparently from Table 3, it was found that the suspension granulation method also provides a toner having improved dispersibility of the azo pigment in the binder resin and a good color tone, and a toner having high transfer efficiency in which image fogging is suppressed.

The toner according to the present invention has a good color tone, and can be used not only as a toner for electrophotography but also as toners for toner displays used in electric papers and formation of circuit patterns as digital fabrication.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-224614, filed Oct. 12, 2011, which is hereby incorporated by reference herein in its entirety.

What is claimed is:

1. A toner comprising toner base particles each of which includes a binder resin, a compound, and an azo pigment as a colorant, wherein the compound has a structure in which a unit represented by formula (1) or formula (2):

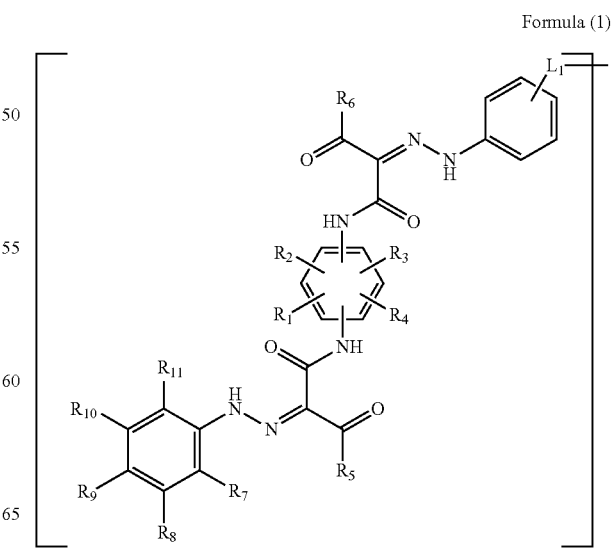

Formula (1)

-continued

Formula (2)

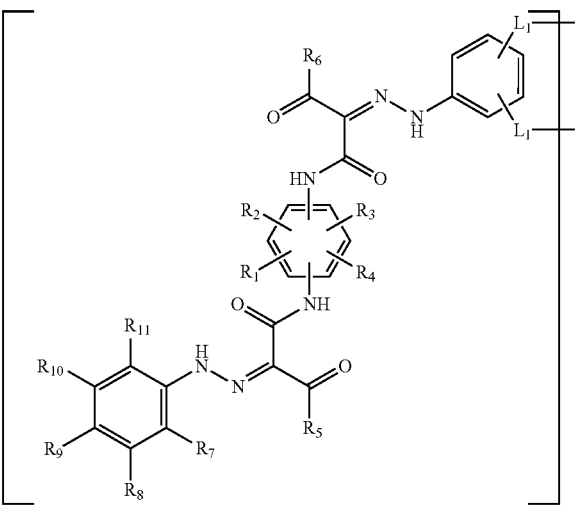

wherein $R_1$ to $R_4$ represent a hydrogen atom or a halogen atom, $R_5$ and $R_6$ represent an alkyl group having 1 to 6 carbon atoms or a phenyl group, $R_7$ to $R_{11}$ represent a hydrogen atom, a $COOR_{12}$ group, or a $CONR_{13}R_{14}$ group, at least one of $R_7$ to $R_{11}$ is a $COOR_{12}$ group or a $CONR_{13}R_{14}$ group, and $R_{12}$ to $R_{14}$ represent a hydrogen atom or an alkyl group having 1 to 3 carbon atoms, and $L_1$ represents a divalent linking group;

bonds to a polymer unit having at least one of a partial structure represented by formula (3) and a partial structure represented by formula (4):

Formula (3)

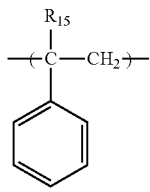

wherein $R_{15}$ represents a hydrogen atom or an alkyl group;

Formula (4)

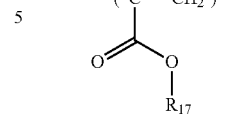

wherein $R_{16}$ represents a hydrogen atom or an alkyl group, and $R_{17}$ represents a hydrogen atom, alkyl group, or an aralkyl group.

2. The toner according to claim 1, wherein $R_5$ and $R_6$ are a methyl group.

3. The toner according to claim 1, wherein $R_9$ and $R_{11}$ are $COOR_{12}$ (wherein $R_{12}$ is the same as above), and $R_8$, $R_9$, and $R_{11}$ are a hydrogen atom.

4. The toner according to claim 1, wherein $L_1$ comprises a carboxylic acid ester bond or a carboxylic acid amide bond.

5. The toner according to claim 1, wherein a unit represented by formula (1) bonds to the polymer unit, and the bonding unit is represented by formula (5):

Formula (5)

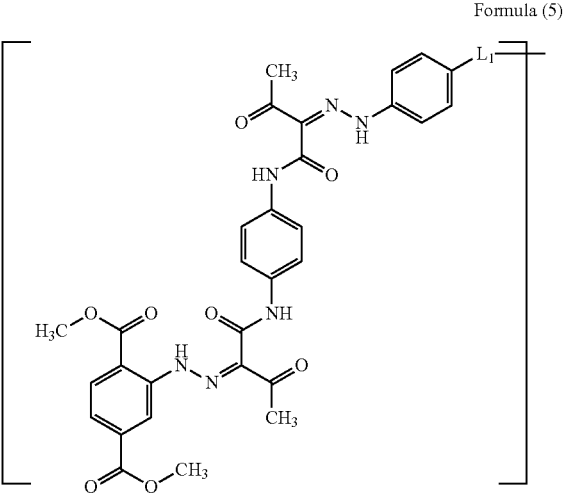

wherein $L_1$ represents a divalent linking group.

6. The toner according to claim 1, wherein the azo pigment is an acetoacetanilide pigment.

7. The toner according to claim 1, wherein the azo pigment is an azo pigment represented by formula (6):

Formula (6)

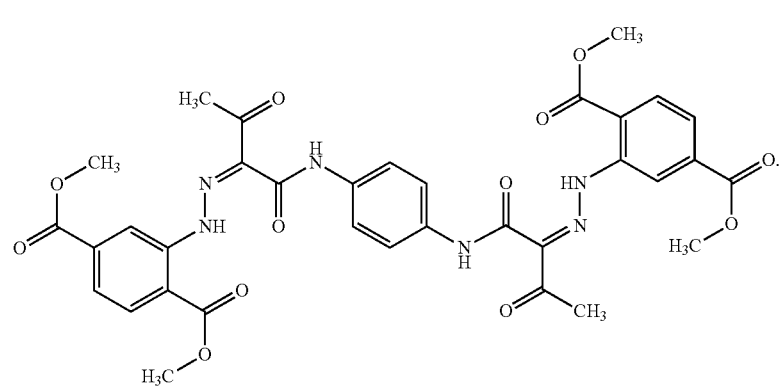

8. The toner according to claim 1, wherein the toner base particles are produced in an aqueous medium.

9. The toner according to claim 8, wherein the toner base particles are produced using a suspension polymerization method.

10. The toner according to claim 8, wherein the toner base particles are produced using a suspension granulation method.

* * * * *